United States Patent
Harris

(10) Patent No.: US 11,225,278 B1
(45) Date of Patent: Jan. 18, 2022

(54) SYSTEMS AND METHODS FOR DISPOSABLE SANITARY COVERS FOR SHOPPING CART HANDLES

(71) Applicant: 1226 SOLUTIONS, LLC, Phoenix, AZ (US)

(72) Inventor: Jonathan Harris, Phoenix, AZ (US)

(73) Assignee: 1226 Solutions, LLC, Phoenix, AZ (US)

( * ) Notice: Subject to any disclaimer, the term of this patent is extended or adjusted under 35 U.S.C. 154(b) by 0 days.

(21) Appl. No.: 17/084,271

(22) Filed: Oct. 29, 2020

(51) Int. Cl.
*B62B 5/06* (2006.01)

(52) U.S. Cl.
CPC ..................... *B62B 5/069* (2013.01)

(58) Field of Classification Search
CPC .............................. B62B 5/069; A47L 25/005
See application file for complete search history.

(56) References Cited

U.S. PATENT DOCUMENTS

| | | | |
|---|---|---|---|
| 2,935,230 A * | 5/1960 | Wolf ...................... | A47G 19/24 222/80 |
| 4,955,914 A * | 9/1990 | Caniglia ................ | A61J 17/113 606/235 |
| 5,215,319 A | 6/1993 | Farris | |
| 5,429,377 A | 7/1995 | Duer | |
| 5,820,142 A * | 10/1998 | Duer ....................... | B62B 5/069 280/33.992 |
| 6,158,640 A * | 12/2000 | Karp ..................... | B62B 3/1408 224/277 |
| 6,869,085 B2 * | 3/2005 | Pettigrew ................. | B62B 5/06 150/154 |
| 7,735,842 B2 * | 6/2010 | Brady ................... | G07F 7/0663 280/33.992 |
| 8,650,715 B2 * | 2/2014 | Sonnendorfer ..... | B41F 23/0403 16/421 |
| 8,714,215 B2 * | 5/2014 | Badgley .................... | B62B 5/06 150/154 |
| 9,452,905 B2 * | 9/2016 | Muderlak ............ | B65H 16/005 |
| 2004/0021279 A1 | 2/2004 | Sobo et al. | |
| 2005/0206104 A1 | 9/2005 | Pettigrew et al. | |
| 2006/0226614 A1 * | 10/2006 | Brilliant .................... | B62B 5/06 280/33.992 |
| 2007/0245850 A1 * | 10/2007 | Ramali ................... | A47B 95/02 74/551.9 |
| 2007/0267828 A1 * | 11/2007 | Egizi ....................... | B62B 5/069 280/33.992 |
| 2008/0001371 A1 * | 1/2008 | Rabiea .................. | B62B 3/1408 280/33.992 |
| 2008/0191434 A1 | 8/2008 | Herron | |
| 2009/0199360 A1 * | 8/2009 | Madanat ................... | B62B 5/06 16/111.1 |

(Continued)

*Primary Examiner* — Emma K Frick
(74) *Attorney, Agent, or Firm* — Snell & Wilmer L.L.P.

(57) ABSTRACT

A sanitary cover arrangement for a shopping cart handle includes a tubular base mount configured to be coupled around the shopping cart handle, a tubular outer sleeve configured to be coupled around the tubular base mount, and a plurality of sanitary film layers coupled to the tubular outer sleeve. Each of the sanitary film layers are dispensable from the tubular outer sleeve. A topmost layer of the plurality of sanitary film layers is removable for exposing another layer therebeneath for providing a sanitary surface for gripping the shopping cart handle.

6 Claims, 20 Drawing Sheets

(56) References Cited

U.S. PATENT DOCUMENTS

2012/0148783 A1* 6/2012 Kunkleman ............ B62B 5/069
　　　　　　　　　　　　　　　　　　　　　　428/43
2013/0078372 A1* 3/2013 Lazzari ................. A01N 25/34
　　　　　　　　　　　　　　　　　　　　　　427/207.1

* cited by examiner

A-A

B-B

B-B

B-B

SYSTEMS AND METHODS FOR DISPOSABLE SANITARY COVERS FOR SHOPPING CART HANDLES

FIELD

The present disclosure relates generally to sanitary coverings, and more particularly to shopping cart handle sanitary covers.

BACKGROUND

Shopping carts are commonly used at supermarkets, home improvement stores, general merchandise stores, megastores/supercenters, electronics stores, and other retailers while buying various consumer items, from home furnishings to electronics to food and beyond. In a given day, many people grasp the handles or grips of the shopping carts during their shopping experience and then return the shopping cart for another customer to use. The frequency and adequacy of the cleaning of the shopping cart handles or grips varies from store to store and day to day, among other factors. Even when shopping cart handles are cleaned regularly, there remains a risk of pathogen transmission even from the transfer of a shopping cart from one customer to another without proper cleaning.

SARS-CoV-2, the virus that causes COVID-19, has recently spread globally, infecting tens of millions of people and killing over a million people worldwide. In response, government leaders have implemented various public health measures to slow virus proliferation. As recently as Oct. 3, 2020, Japanese researchers published a study of the survival of SARS-CoV-2 on various surfaces. (Ryohei Hirose, et al., Survival of SARS-CoV-2 and influenza virus on the human skin: Importance of hand hygiene in COVID-19, Clinical Infectious Diseases, ciaa1517, https:// doi.org/10.1093/cid/ciaa1517, https:// academic.oup.com/cid/advance-article/doi/10.1093/cid/ciaa1517/5917611). The study found that SARS-CoV-2 has a survival time of approximately 9 hours on human skin and 84 hours on stainless steel. There remains a risk of surface transmission of SARS-CoV-2 during the survival period of the virus. Due to the risk of virus transmission, especially at high-traffic areas, supermarkets and grocery stores have experienced a decline in the number of in-person shoppers visiting their stores.

SUMMARY

A sanitary cover arrangement for a shopping cart handle is disclosed, comprising a tubular base mount configured to be coupled around the shopping cart handle, a tubular outer sleeve configured to be coupled around the tubular base mount, and a plurality of sanitary film layers coupled to the tubular outer sleeve. Each of the sanitary film layers are dispensable from the tubular outer sleeve. A topmost layer of the plurality of sanitary film layers is removable for exposing another layer therebeneath for providing a sanitary surface for gripping the shopping cart handle.

In various embodiments, the topmost layer of the plurality of sanitary film layers is removable for exposing another layer therebeneath for providing a sterile surface for gripping the shopping cart handle.

In various embodiments, the tubular base mount comprises a first half and a second half, wherein the first half couples to the second half to secure the tubular base mount to the shopping cart handle.

In various embodiments, the tubular base mount comprises a ratcheting locking mechanism for coupling the first half to the second half.

In various embodiments, the ratcheting locking mechanism comprises a first tab extending from the first half, the first tab comprising a plurality of teeth, and a second tab extending from the second half, the second tab comprising a pawl configured to mechanically engage the plurality of teeth to lock the first half from pulling apart from the second half.

In various embodiments, the first half is configured to be coupled to the second half via a magnetic connection.

In various embodiments, the tubular outer sleeve comprises a first side and a second side, wherein the first side faces the second side to define a longitudinally extending slit therebetween, wherein the first side is configured to be pried apart from the second side to fit the tubular outer sleeve over the tubular base mount.

In various embodiments, the first side comprises a protruding member extending towards the second side, and the second side comprises a recess, wherein the protruding member extends into the recess.

In various embodiments, the tubular base mount comprises a living hinge whereby the first half is coupled to the second half.

In various embodiments, the tubular base mount comprises a compliant inner layer configured to contact the shopping cart handle, wherein the compliant inner layer is configured to conform to a geometry of the shopping cart handle.

In various embodiments, the tubular base mount comprises a tubular portion, a first flared tab extending from the tubular portion, and a second flared tab extending from the tubular portion, wherein the first flared tab and the second flared tab at least partially define a longitudinally extending slit disposed in the tubular base mount.

In various embodiments, the sanitary cover arrangement further comprises a liquid container coupled to the tubular base mount. The base mount is disposed in a cutout of the liquid container.

A tubular base mount for a shopping cart handle is disclosed, comprising a first half, a second half, and a living hinge extending between the first half and the second half whereby the first half is moveable with respect to the second half.

In various embodiments, the tubular base mount comprises a ratcheting locking mechanism for coupling the first half to the second half.

In various embodiments, the ratcheting locking mechanism comprises a first tab extending from the first half, the first tab comprising a plurality of teeth, and a second tab extending from the second half, the second tab comprising a pawl configured to mechanically engage the plurality of teeth to lock the first half from pulling apart from the second half.

In various embodiments, the first half is configured to be coupled to the second half via a magnet.

In various embodiments, the first half comprises an outer skin, a first end rib disposed at a first end of the outer skin, a second end rib disposed at a second end of the outer skin, and a middle rib disposed between the first end rib and the second end rib.

In various embodiments, the first end rib extends from an interior surface of the outer skin, the second end rib extends from the interior surface of the outer skin, and the middle rib extends from the interior surface of the outer skin, and a height of the middle rib is less than a height of the first end rib.

In various embodiments, the tubular base mount comprises a compliant inner layer configured to contact the shopping cart handle, wherein the compliant inner layer is configured to conform to a geometry of the shopping cart handle.

A method of providing a sanitary surface over a grip of a shopping cart is disclosed, comprising attaching a base mount to the grip of the cart, attaching an outer sleeve to the base mount, wherein the outer sleeve comprises a sanitary cover comprising a plurality of film layers, and removing a topmost layer of the sanitary cover for exposing another layer therebeneath for providing a sanitary surface.

In various embodiments, the outer sleeve comprises a longitudinally extending slit whereby the base mount is received by the outer sleeve.

In various embodiments, the base mount comprises a first half, a second half, and a living hinge extending between the first half and the second half whereby the first half is moveable with respect to the second half.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
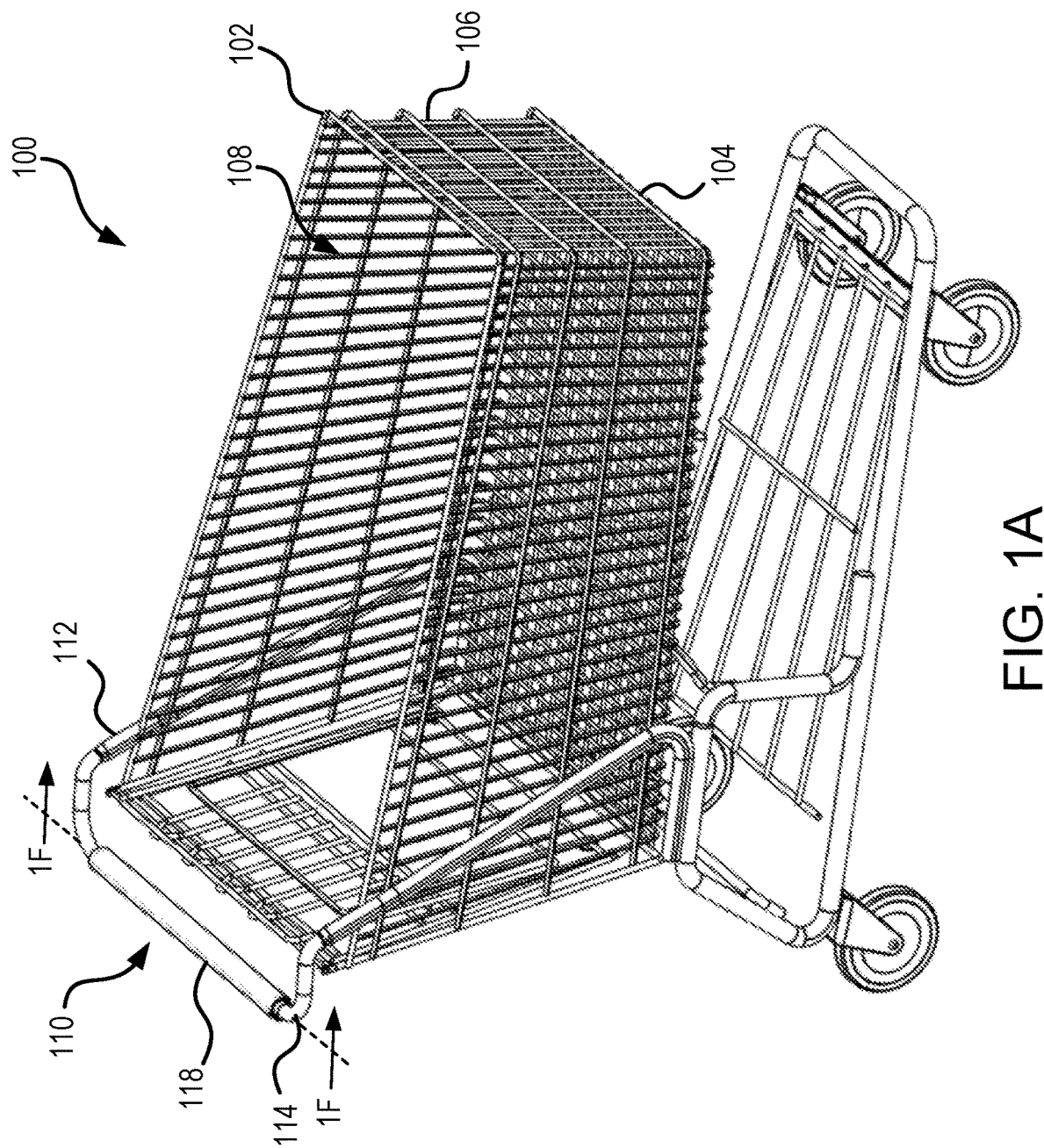
FIG. 1A illustrates a perspective view of a shopping cart according to various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching is used throughout the figures to denote different parts but not necessarily to denote the same or different materials.

As used herein, "distal" refers to the direction radially outward, or generally, away from a centerline axis of a member. As used herein, "proximal" refers to a direction radially inward, or generally, towards a centerline axis of a member. For example, with brief reference to FIG. 4F, surface 458 may be described as a proximal surface because surface 458 faces radially inward, or generally, towards a centerline axis of base mount 430.

As used herein, the term "tubular" refers both to having the form of a hollow cylindrical tube and to having the form of a solid surface at least partially enclosing a hollow passageway. In this manner, the term "tubular" encompasses structures having any cross-sectional profile e.g., a circle, an oval, square, a rectangle, a triangle, a trapezoid, a parallelogram and the like. In this regard, "tubular" is not limited to symmetrical geometries and is not limited to cylindrical structures.

Shopping cart grip sanitary cover arrangements of the present disclosure include, in various embodiments, multiple film layers stacked, for example, one on top of another with a bottommost layer being attached to a carrier, as described herein in further detail. In use, a topmost layer of the sanitary cover may be removable for exposing another layer therebeneath for providing a sanitary and/or sterile surface for being gripped by a user. In this manner, the spread of pathogens between users of highly engaged portions of a shopping cart is reduced. Furthermore, shopping cart grip sanitary cover arrangements of the present disclosure may provide shoppers and government leaders with increased confidence to reengage with in-person shopping.

Shopping cart grip sanitary cover arrangements, in accordance with various embodiments, include a base mount for providing a standard sized structure whereon an outer sleeve carrier is installed. The outer sleeve carrier may be a disposable carrier including the multiple film layers. After the multiple film layers have been used, the outer sleeve carrier may be discarded and a new outer sleeve carrier with a stack of film layers may be installed over the standard sized base mount. In this manner, shopping cart grip sanitary cover arrangements of the present disclosure are compatible with various cart handles of various shapes and sizes.

With reference to FIG. 1A, a shopping cart 100 is illustrated, in accordance with various embodiments. Shopping cart 100 may include a basket portion 102 having a bottom 104 and a plurality of sides 106 coupled thereto and extending upwardly therefrom. The basket portion 102 thus defines an interior space 108 for storing articles therein. Also included is a plurality of wheels coupled to the bottom of the shopping cart 100 for transporting purposes.

The shopping cart 100 further includes a handle arrangement 110 having a pair of substantially vertical posts 112 with inboard ends coupled to the sides 106 of the shopping cart 100 and extending upwardly and rearwardly therefrom. Associated therewith is a substantially horizontal handle 114 coupled to outboard ends of the posts 112.

While a shopping cart 100 is specifically described, it should be noted that the principles set forth herein may be applied in the context of any cart-like device. For example, an airport luggage cart, flat bed style carts, any cart used by multiple users, or any other cart-like device may be considered within the scope of the present invention.

Figure 1B:
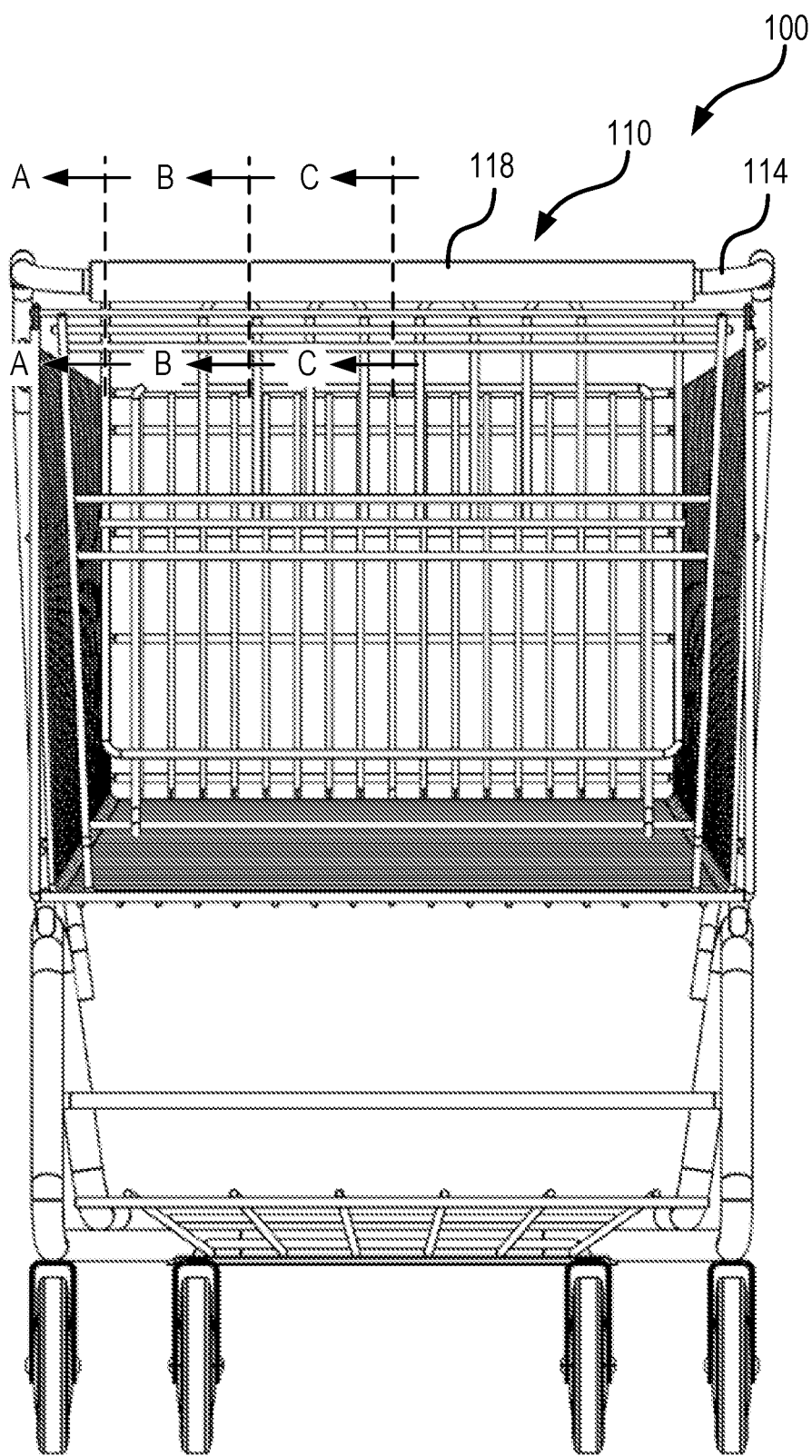
FIG. 1B illustrates a rear view of the shopping cart of FIG. 1A according to various embodiments.

With additional references to FIG. 1B, a rear view of shopping cart 100 is illustrated, in accordance with various embodiments. In various embodiments, handle 114 includes a substantially tubular configuration. Also included is a cart grip sanitary cover arrangement 118 having multiple film layers each with a top face, a bottom face, and a periphery formed therebetween. The film layers are stacked one on top of another with a bottommost layer being attached to a carrier, as described herein in further detail. In use, a topmost layer of the sanitary cover is removable for exposing another layer therebeneath for providing a sanitary surface for being gripped by a user. Thus, each user of the cart 100 may be provided with a new sanitary surface to grip during use. Various FIGs of the present disclosure illustrate cross-section views (e.g., section A-A, section B-B, and section C-C) of handle arrangement 110 in accordance with various embodiments of the present disclosure.

Figure 1C:
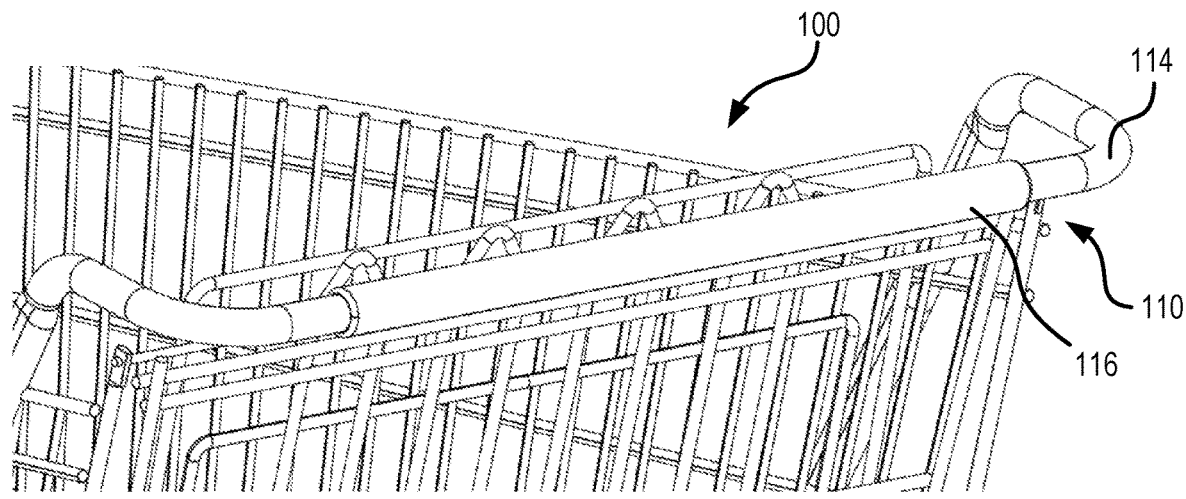
FIG. 1C illustrates a perspective view of a shopping cart grip according to various embodiments.

With reference to FIG. 1C, shopping cart 100 is illustrated with a cart grip sanitary cover omitted. Handle 114 may include a grip 116 for being handled by a user to maneuver the shopping cart 100. In various embodiments, the grip 116 includes a substantially tubular configuration. In various embodiments, the grip 116 is constructed from a plastic material, such as a thermoplastic or thermoset. In various embodiments, the grip 116 may be constructed from a separate or integral metallic or elastomeric piece, or any other material with any desired type of configuration that is capable of being gripped by a user. Typical shopping cart grips are manufactured to various shapes and sizes. In this regard, the length and width of grip 116 may vary amongst different shopping carts and shopping cart manufacturers.

Figure 1D:
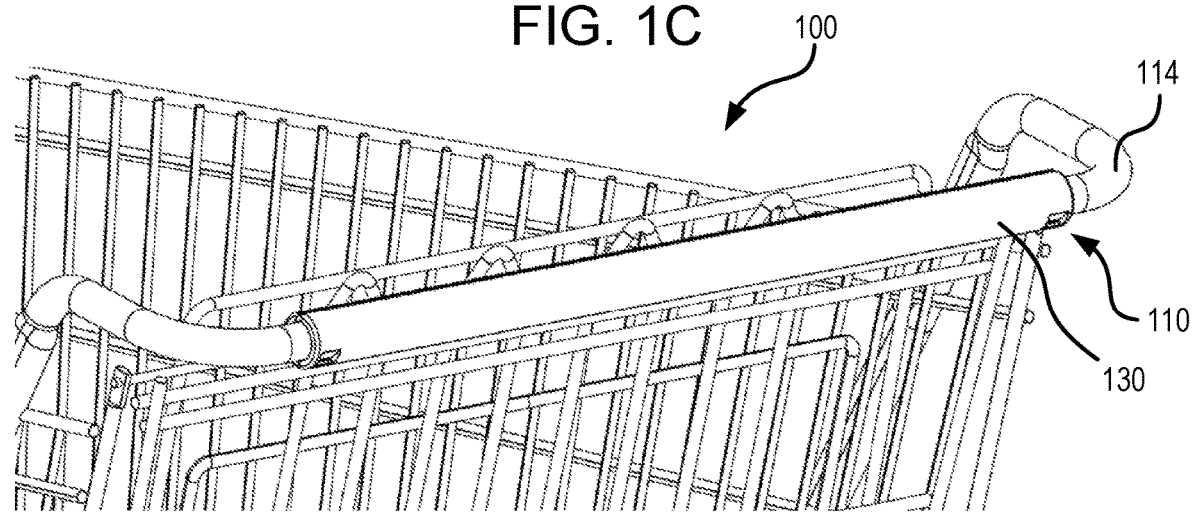
FIG. 1D illustrates a perspective view of a base mount installed over the shopping cart grip of FIG. 1C according to various embodiments.

With reference to FIG. 1D, shopping cart 100 is illustrated with a base mount 130 installed over grip 116 (see FIG. 1C). Base mount 130 may be installed over grip 116 to provide a surface for installing an outer sleeve 150 (see FIG. 1E) to handle 114. As previously mentioned, shopping cart handles 114 and/or shopping cart grips 116 may be manufactured to various shapes and sizes. Base mount 130 may be configured to be installed over these various shopping cart handles 114 and/or shopping cart grips 116 to provide a standard (i.e., uniform) sized structure to which outer sleeve 150 (see FIG. 1E) is mounted. In this manner, outer sleeve 150 (see FIG. 1E) may be readily mounted to virtually all shopping cart handles, regardless of the particular size and/or shape of the handle. Although described as a standard sized structure, it should be understood that the exact outer profile of base mount 130 may slightly vary, for example depending on how closely the base mount is conformed onto a shopping cart handle, in accordance with various embodiments. However, the outer profile of base mount 130 allows outer sleeve 150 (see FIG. 1E) to be disposed around base mount 130. Base mount 130 may be constructed from a plastic material, such as a thermoplastic or thermoset. However, base mount 130 may be constructed from any suitable material or mixture of materials, including metal, silicone, rubber, polytetrafluoroethylene ("PTFE"), and/or a combinations thereof.

Figure 1E:
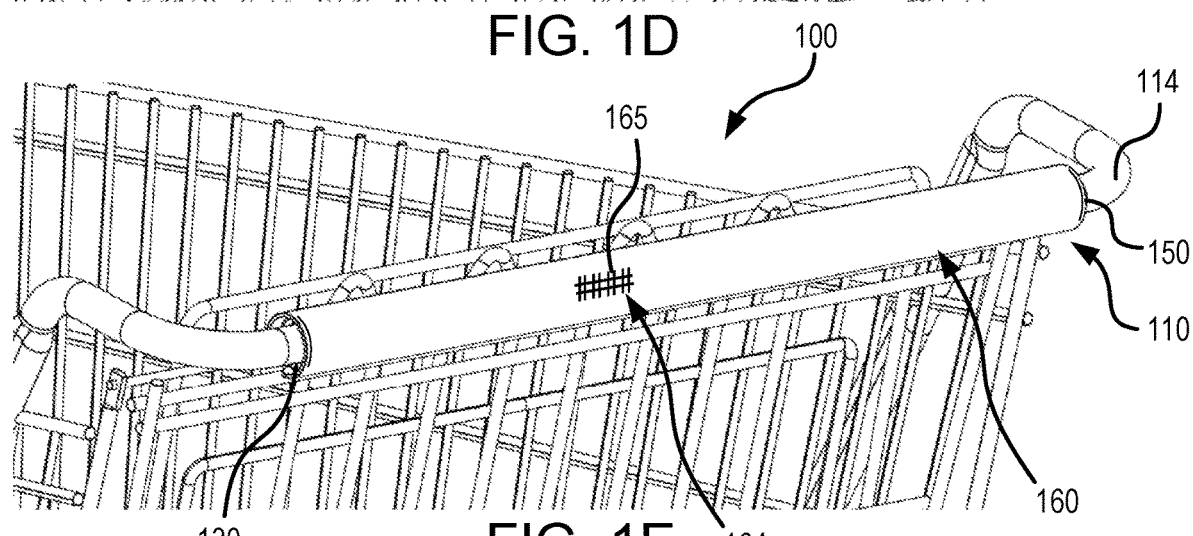
FIG. 1E illustrates a perspective view of an outer sleeve installed over the base mount of FIG. 1D according to various embodiments.

With reference to FIG. 1E, shopping cart 100 is illustrated with outer sleeve 150 installed over base mount 130. Outer sleeve 150 may be constructed from a plastic material, such as a thermoset or thermoplastic, in accordance with various embodiments. Outer sleeve 150 may be constructed from a paper-based material (e.g., cardboard), in accordance with various embodiments. Outer sleeve 150 may be a carrier for a plurality of disposable film layers 160 for providing a sanitary surface for gripping shopping cart handle 114, as described herein in further detail.

In various embodiments, each of the disposable film layers 160 may comprise one or more images 164 printed thereon. The term "image" includes, without limitation, any picture, graphic, text or other indicia or combination thereof. In various embodiments, the plurality of disposable film layers 160 may provide a vehicle for advertisement(s) to a shopper, via image 164. Said advertisements may include promotion, coupon, sale, discount, or other business information. Furthermore, said advertisements may include bar code(s) and/or quick response (QR) code(s) which are readable by an electronic device such as a cell phone. In this manner, the QR code and/or barcode may direct an electronic device to access a coupon, an affinity or customer loyalty program, an application, a web site, or another resource that may offer information about a product, along with potential discounts and other incentives.

In various embodiments, image 164 may be printed using a time limited ink 165. In this manner, the ink may "disappear" or become invisible to the naked eye after a period of time being exposed to ambient air. In this regard, the period of time may begin when the disposable film layer 160 is exposed by removing a top layer. The period of time may be, for example, 1 hour, 2 hours, 12 hours, or any suitable period of time. The period of time that the ink is visible may be chosen based upon a duration for which the disposable film layer 160 is considered to be sanitary. In this manner, a user may perceive that the topmost disposable film layer 160 should be disposed of after the image 164 has faded or disappeared. The time limited ink 165 may comprise a disappearing ink, such as an ink that fades or disappears in response to exposure to air. In this manner, time limited ink 165 may comprise thymolphthalein and/or phenolphthalein, which may fade in response to exposure to air.

In various embodiments, time limited ink 165 may comprise a decoloring ink or toner. In various embodiments, the decoloring ink can be made of any existing decoloring ink which allows chemical interactions between normal ink and decoloring chemical substance so that the ink will decolor or fade after some time in the air. It can be some type of dissolvent that will erode the regular ink or toner during the interactions. Some of the decoloring ink, or agent can be made of a bleaching agent, oxidant, oxidizer or other decolourant. By mixing and adjusting the percentage and/or with the density of both inks, the fading speed that the ink vanishes and how long the ink will become fully decolored can be controlled and determined. However, any suitable time limited ink 165 which changes visually with age is contemplated herein.

Figure 1F:
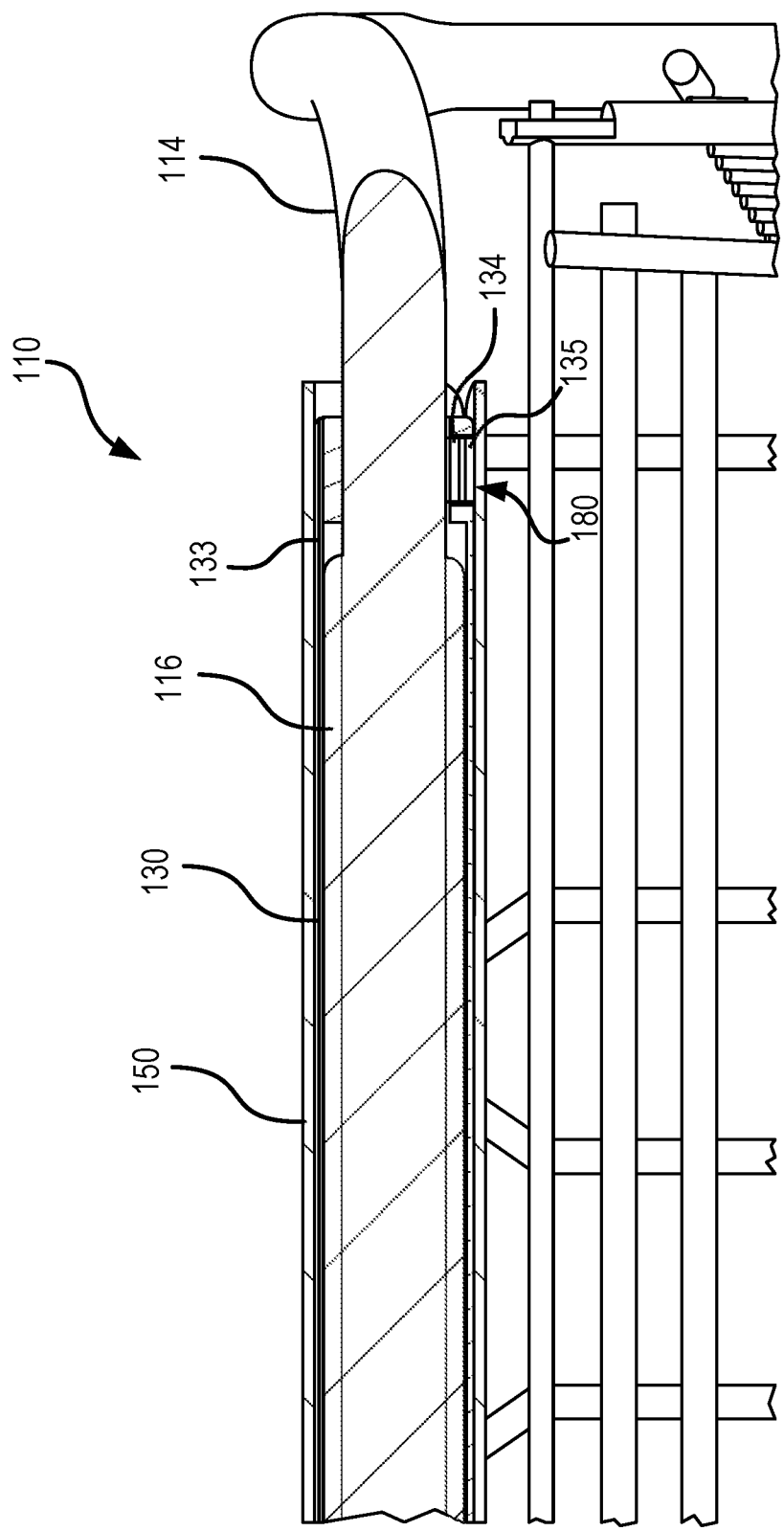
FIG. 1F illustrates a section view of the handle arrangement of FIG. 1A according to various embodiments.

With reference to FIG. 1F, a section view of an end of handle arrangement 110 is illustrated, in accordance with various embodiments. With combined reference to FIG. 1F and FIG. 1G, base mount 130 may comprise a first half 131 and a second half 132. First half 131 and second half 132 may be moveable with respect to one another to open base mount 130 to install base mount 130 over shopping cart handle 114 and also to close base mount 130 securely around the shopping cart handle 114. In various embodiments, first half 131 is coupled to second half 132 via a living hinge 133. First half 131, second half 132, and living hinge 133 may be formed as a single, monolithic piece of material. Living hinge 133 may comprise a thin ribbon of material extending between first half 131 and second half 132 for providing a hinge whereby first half 131 may be rotated with respect to second half 132 for opening and closing base mount 130.

In various embodiments, base mount 130 comprises a locking mechanism 180 for securing base mount 130 to shopping cart handle 114. In various embodiments, the locking mechanism 180 comprises a first tab 134 and a second tab 135. First tab 134 may comprise a series of ratchet teeth 136 extending towards second tab 135. Second tab 135 may comprise a pawl 137 extending towards first tab 134. Pawl 137 may be configured to securely engage a portion of the series of ratchet teeth 136 in response to base mount 130 being clamped around a shopping cart handle 114 to secure base mount 130 to the shopping cart handle 114. In this regard, the locking mechanism may comprise a catch or pawl 137 comprising a ridge configured to engage ratchet teeth 136, allowing movement of first tab 134 in only one direction 191. In various embodiments, second tab 135 may be flexed outward away from first tab 134 to disengage pawl 137 from ratchet teeth 136 to remove base mount 130 from shopping cart handle 114. In various embodiments, base mount 130 comprises said locking mechanism 180 at either end of base mount 130. In various embodiments, the locking mechanism 180 (i.e., first tab 134 and second tab 135) may be configured to surround shopping cart handle 114. In various embodiments, grip 116 may be disposed entirely between locking mechanisms 180 disposed at either end of base mount 130 (see also FIG. 1F). In this regard, locking mechanism 180 may be longitudinally adjacent grip 116.

Figure 1G:
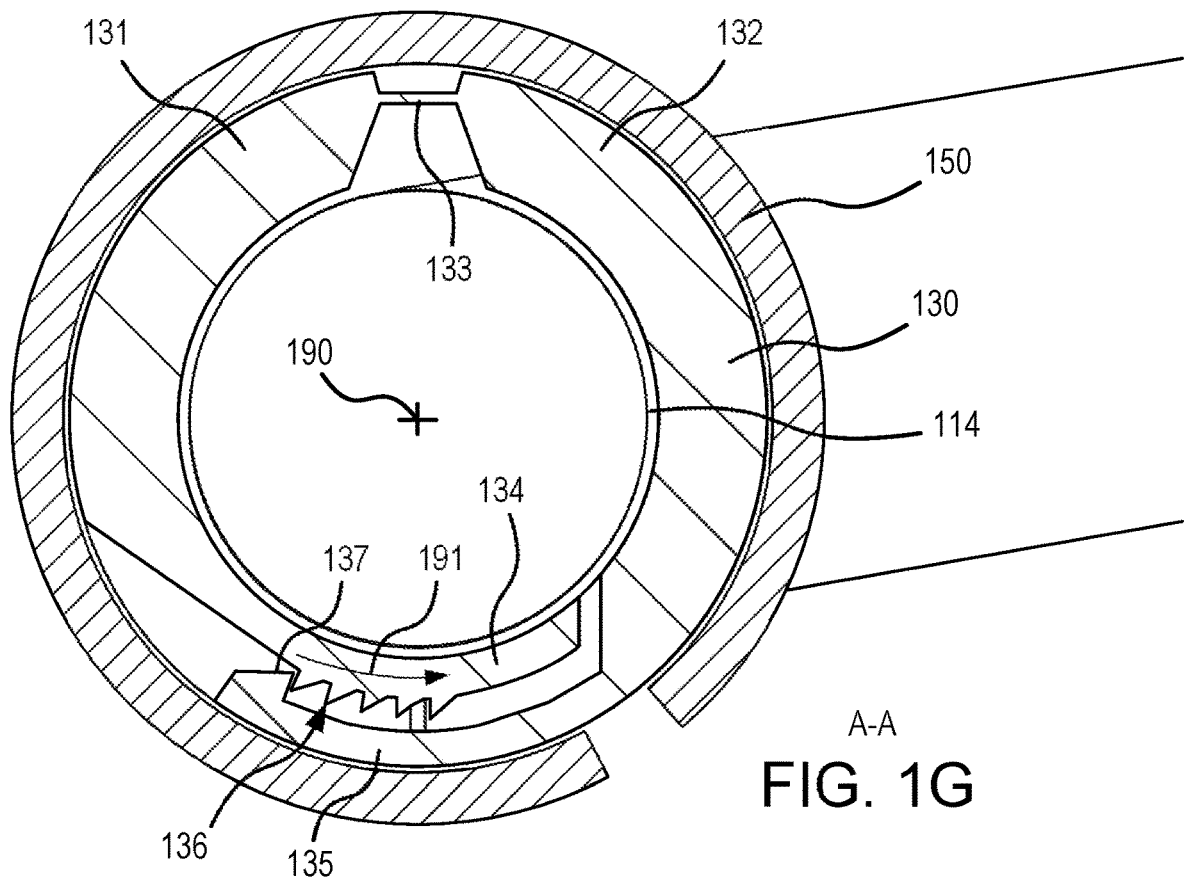
FIG. 1G illustrates a section view taken along line A-A of the handle arrangement of FIG. 1B according to various embodiments.
Figure 1H:
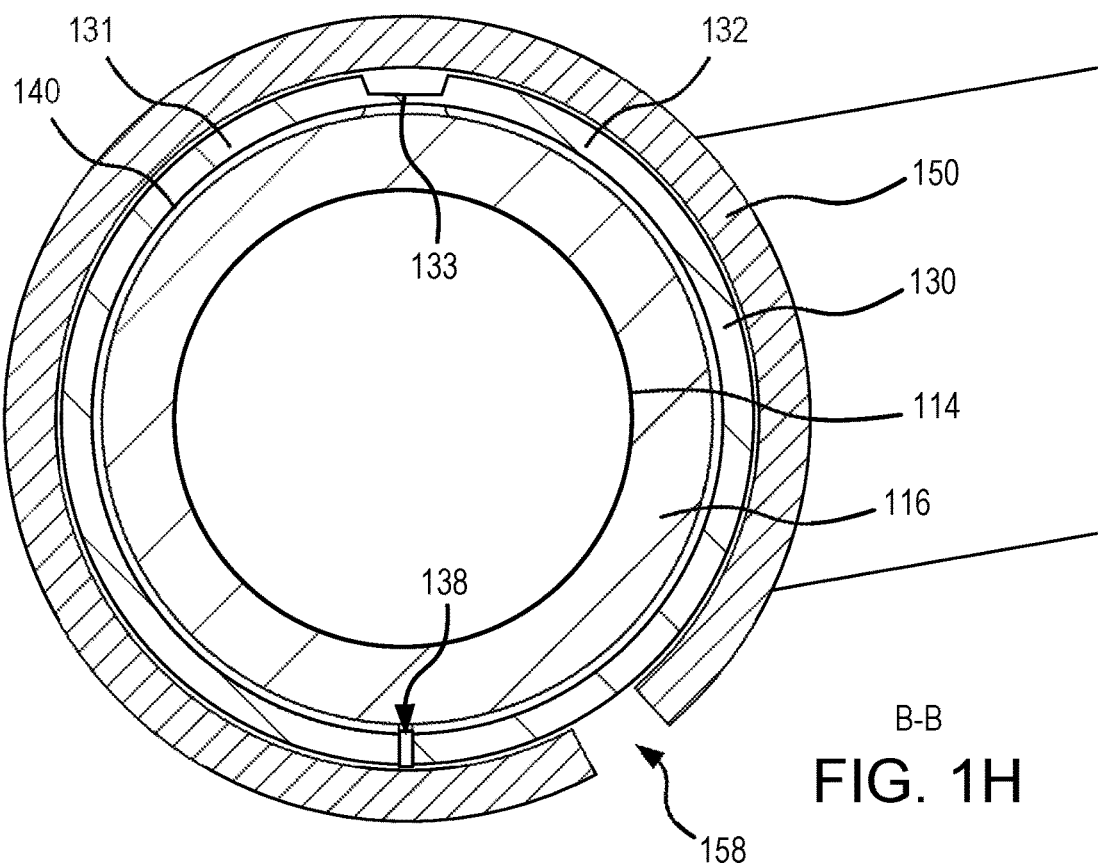
FIG. 1H illustrates a section view taken along line B-B of the handle arrangement of FIG. 1B according to various embodiments.

With combined reference to FIG. 1G and FIG. 1H, first half 131 faces second half 132 to define a longitudinally extending slit 138 therebetween when the base mount 130 is in an installed position. In various embodiments, first tab 134 traverses said slit 138 in the installed position (see also FIG. 2A). In various embodiments, second tab 135 traverses said slit 138 in the installed position (see also FIG. 2B).

In various embodiments, base mount 130 comprises a compliant inner layer 140 configured to contact grip 116. Compliant inner layer 140 may comprise a layer of a relatively soft material that can conform to the geometry of grip 116. In various embodiments, compliant inner layer 140 comprises a polymer material such as polysiloxane, silicone, PTFE, natural rubbers, and synthetic rubbers, among others. Compliant inner layer 140 may comprise a foam material (such as visco elastic foam), or any other pliable material. In this manner, compliant inner layer 140 may deform around grip 116 in response to base mount 130 being tightened over the shopping cart handle 114, thereby allowing base mount 130 to securely mount to various shaped and sized shopping cart handles 114 and/or grips 116. Compliant inner layer 140 may be secured to the interior surface of base mount 130 via an adhesive, in accordance with various embodiments. In various embodiments, compliant inner layer 140 comprises two separate pieces coupled to first half 131 and second half 132, respectively.

Figure 1I:
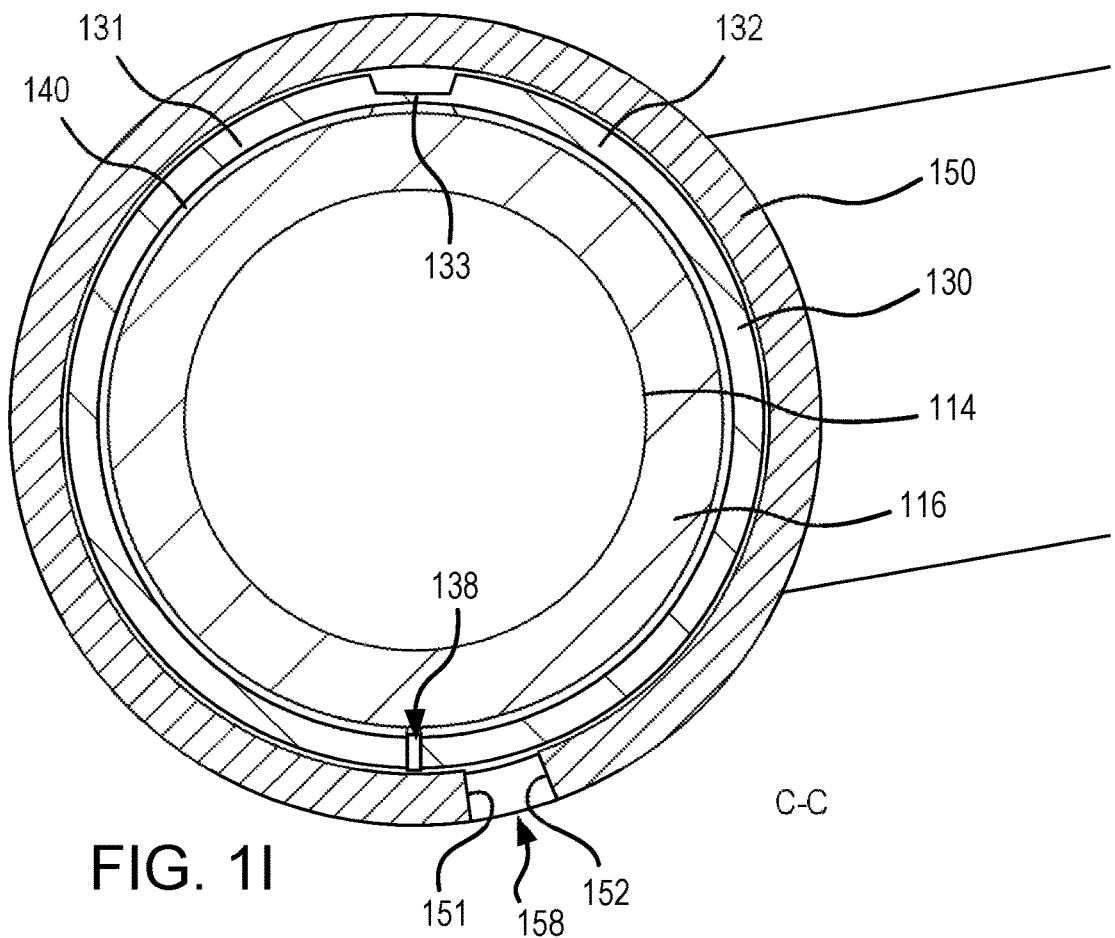
FIG. 1I illustrates a section view taken along line C-C of the handle arrangement of FIG. 1B according to various embodiments.

With reference to FIG. 1I, a section view of handle arrangement 110 taken along section C-C of FIG. 1B is illustrated, in accordance with various embodiments. With combined reference to FIG. 1I and FIG. 3B, outer sleeve 150 comprises a first side 151 and a second side 152. First side 151 may face second side 152 to define a longitudinally extending slit 158 therebetween. First side 151 may be pried away from second side 152 to fit outer sleeve 150 over base mount 130. Stated differently, base mount 130 may be received by outer sleeve 150 via longitudinally extending slit 158. First side 151 may comprise a protruding member 153 extending towards the second side 152. Second side 152 may comprise a recess 154. Protruding member 153 may extend into recess 154. In this manner, protruding member 153 may mitigate longitudinal movement of first side 151 with respect to second side 152 to aid in securing outer sleeve 150 to base mount 130. In various embodiments, protruding member 153 and recess 154 are disposed at a midpoint of outer sleeve 150.

Figure 1J:
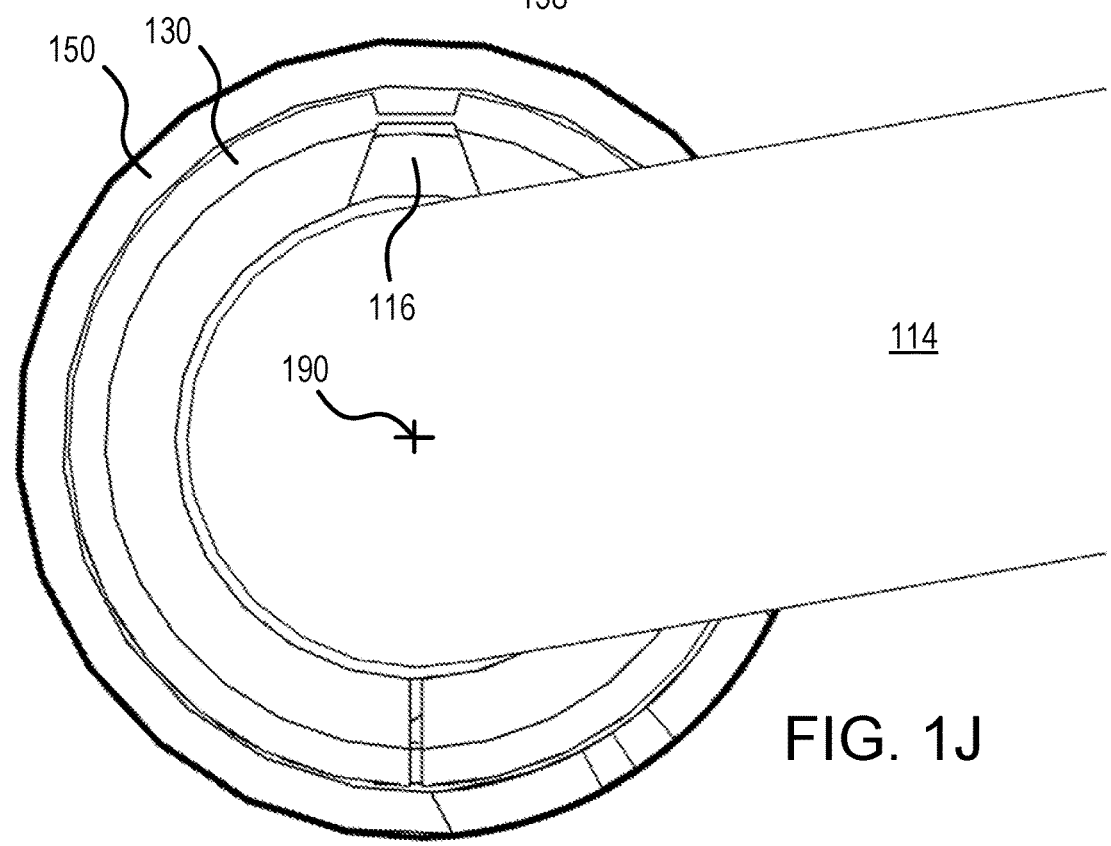
FIG. 1J illustrates a side view of the handle arrangement of FIG. 1B according to various embodiments.

With reference to FIG. 1J, a side view of handle arrangement 110 is illustrated, in accordance with various embodiments. Outer sleeve 150 and base mount 130 may be arranged in concentric relationship with respect to one another. Base mount 130 and grip 116 may be arranged in concentric relationship with respect to one another. Grip 116 and shopping cart handle 114 may be arranged in concentric relationship with respect to one another. Stated differently, outer sleeve 150, base mount 130, grip 116, and shopping cart handle 114 may be coaxially aligned and/or substantially coaxially aligned with centerline axis 190.

With respect to FIG. 2A through FIG. 3B, elements with like element numbering, as depicted in FIG. 1A through FIG. 1J, are intended to be the same and will not necessarily be repeated for the sake of clarity.

Figure 2A:
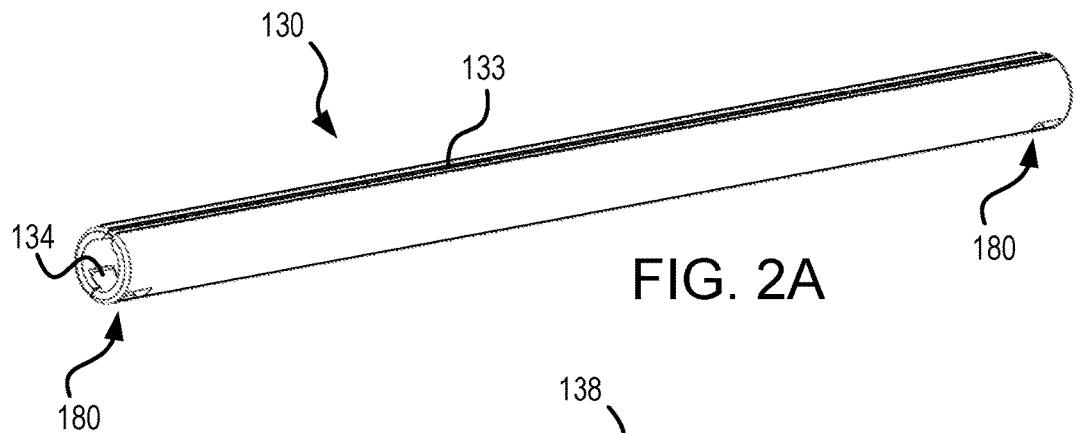
FIG. 2A illustrates a perspective view of the base mount of FIG. 1D according to various embodiments.

With reference to FIG. 2A, a perspective view of base mount 130 is illustrated, in accordance with various embodiments. In various embodiments, base mount 130 comprises a generally tubular geometry.

Figure 2B:
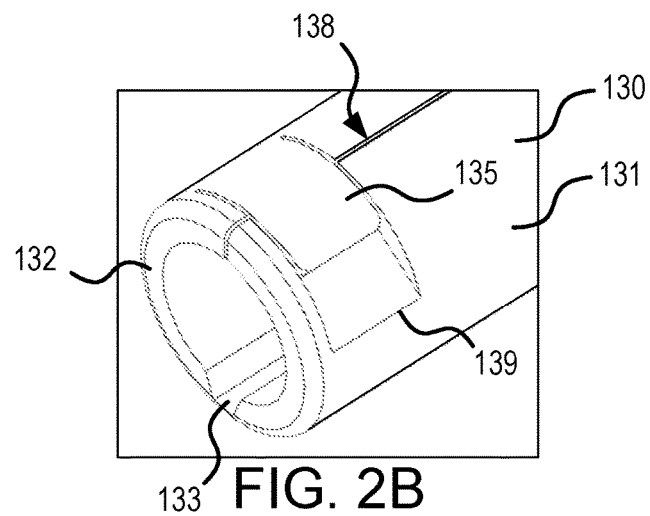
FIG. 2B illustrates a perspective view of a locking mechanism of the base mount of FIG. 2A according to various embodiments.

With reference to FIG. 2B, first half 131 may comprise a cutout 139 for receiving second tab 135. Second tab 135 may be generally flush with the distal surface of first half 131 and the distal surface of second half 132 in an installed position.

Figure 3A:
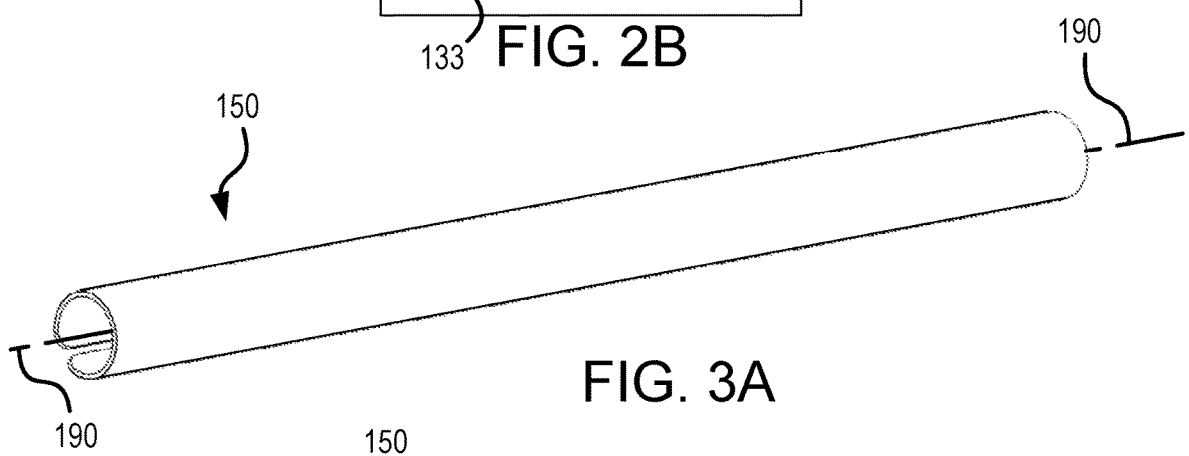
FIG. 3A illustrates a perspective view of the outer sleeve of FIG. 1E according to various embodiments.
Figure 3B:
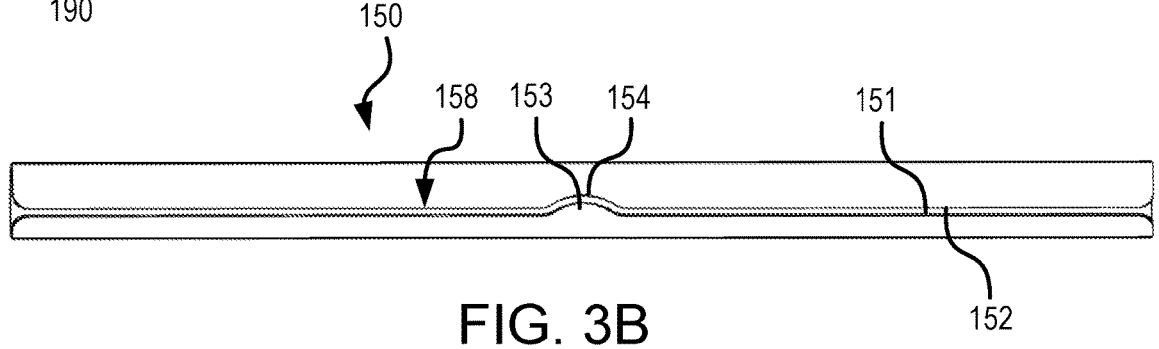
FIG. 3B illustrates a bottom view of the outer sleeve of FIG. 3A according to various embodiments.

With reference to FIG. 3A, a perspective view of outer sleeve 150 is illustrated, in accordance with various embodiments. In various embodiments, outer sleeve 150 comprises a generally tubular geometry. With reference to FIG. 3B, a bottom view of outer sleeve 150 is illustrated, in accordance with various embodiments.

Figure 4A:
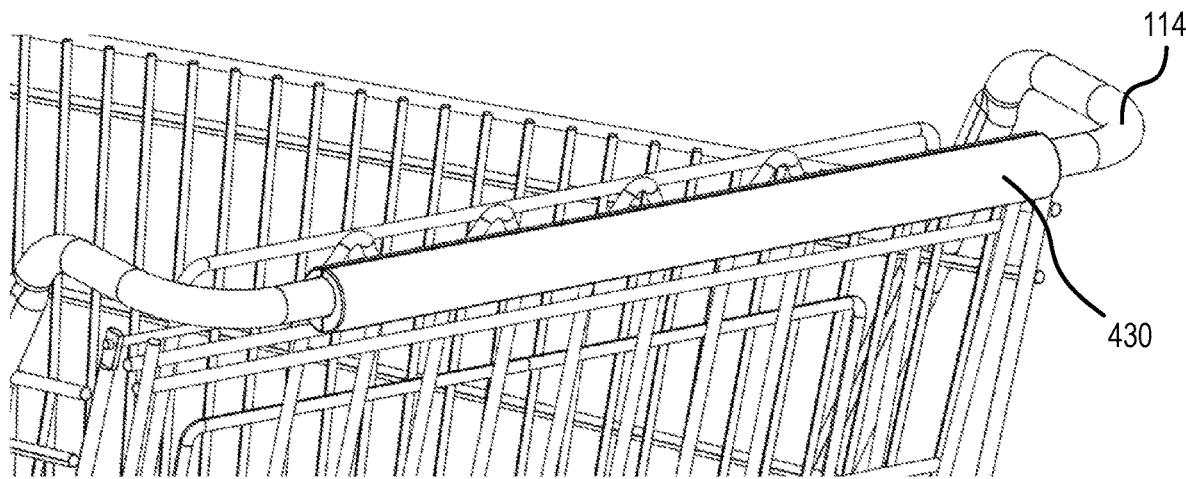
FIG. 4A illustrates a perspective view of a base mount installed over the shopping cart grip of FIG. 1C according to various embodiments.

With reference to FIG. 4A, shopping cart 100 is illustrated with a base mount 430 installed over grip 116 (see FIG. 1C). Outer sleeve 150 is omitted for clarity purposes. Base mount 430 may be constructed from a plastic material. Base mount 430 may be installed over grip 116 to provide a surface for installing an outer sleeve 150 (see FIG. 1E) to handle 114. Base mount 430 may be configured to be installed over various shopping cart handles 114 and/or shopping cart grips 116 to provide a standard (i.e., uniform) sized structure to which outer sleeve 150 (see FIG. 1E) is mounted. Base mount 430 may be similar to base mount 430, except that instead of comprising a ratcheting locking mechanism, base mount 430 is held together via a magnetic locking mechanism (also referred to herein as a magnetic connection). In this manner, base mount 430 may snap over grip 116 (see FIG. 1C).

Figure 4B:
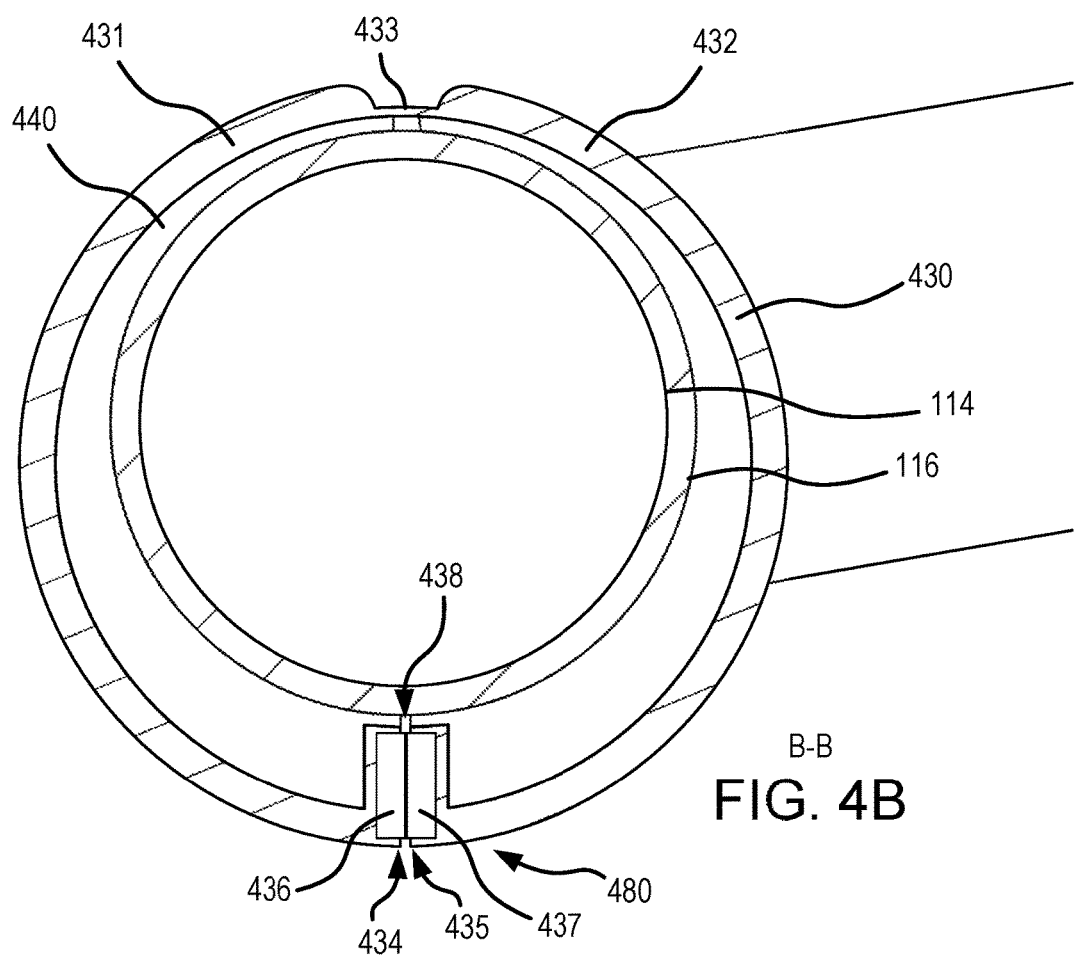
FIG. 4B illustrates a section view of the handle arrangement of FIG. 4A according to various embodiments.

With reference to FIG. 4B, a section view of base mount 430 installed over a shopping cart handle 114 is illustrated, in accordance with various embodiments. Base mount 430 may comprise a first half 431 and a second half 432. First half 431 and second half 432 may be moveable with respect to one another to open base mount 430 to install base mount 430 over shopping cart handle 114 and also to close base mount 430 securely around the shopping cart handle 114. In various embodiments, first half 431 is coupled to second half 432 via a living hinge 433. First half 431, second half 432, and living hinge 433 may be formed as a single, monolithic piece of material. Living hinge 433 may comprise a thin ribbon of material extending between first half 431 and second half 432 for providing a hinge whereby first half 431 may be rotated with respect to second half 432 for opening and closing base mount 430.

First half 431 of base mount 430 may comprise a first side 434. Second half 432 of base mount 430 may comprise a second side 435. First side 434 may face second side 435 to define a longitudinally extending slit 438 therebetween. In various embodiments, base mount 430 comprises a locking mechanism 480 for securing base mount 430 to shopping cart handle 114. In various embodiments, the locking mechanism 480 comprises a first magnet 436. First magnet 436 may be provided at first side 434. The locking mechanism 480 may further comprise a second magnet 436. Second magnet 436 may be provided at second side 435. In this regard, first magnet 436 and second magnet 437 may be disposed opposite base mount 430 from living hinge 433. First magnet 436 may align with second magnet 437 such that the magnetic fields of first magnet 436 and second magnet 437 are attracted to one another to pull first half 431 together with second half 432, thereby locking base mount 430 to handle 114. First side 434 may be pried away from second side 435 to remove base mount 430 from, or install base mount 430 to, handle 114. First magnet 436 and second magnet 437 may each comprises longitudinally extending magnets that extend continuously along the length of base mount 430, or may comprise discrete magnets spaced apart along first side 434 and second side 435, respectively. First magnet 436 and/or second magnet 437 may be a permanent magnet, such as a neodymium magnet, an aluminum nickel cobalt magnet, a samarium cobalt magnet, or a ferrite magnet, in accordance with various embodiments.

Figure 9:
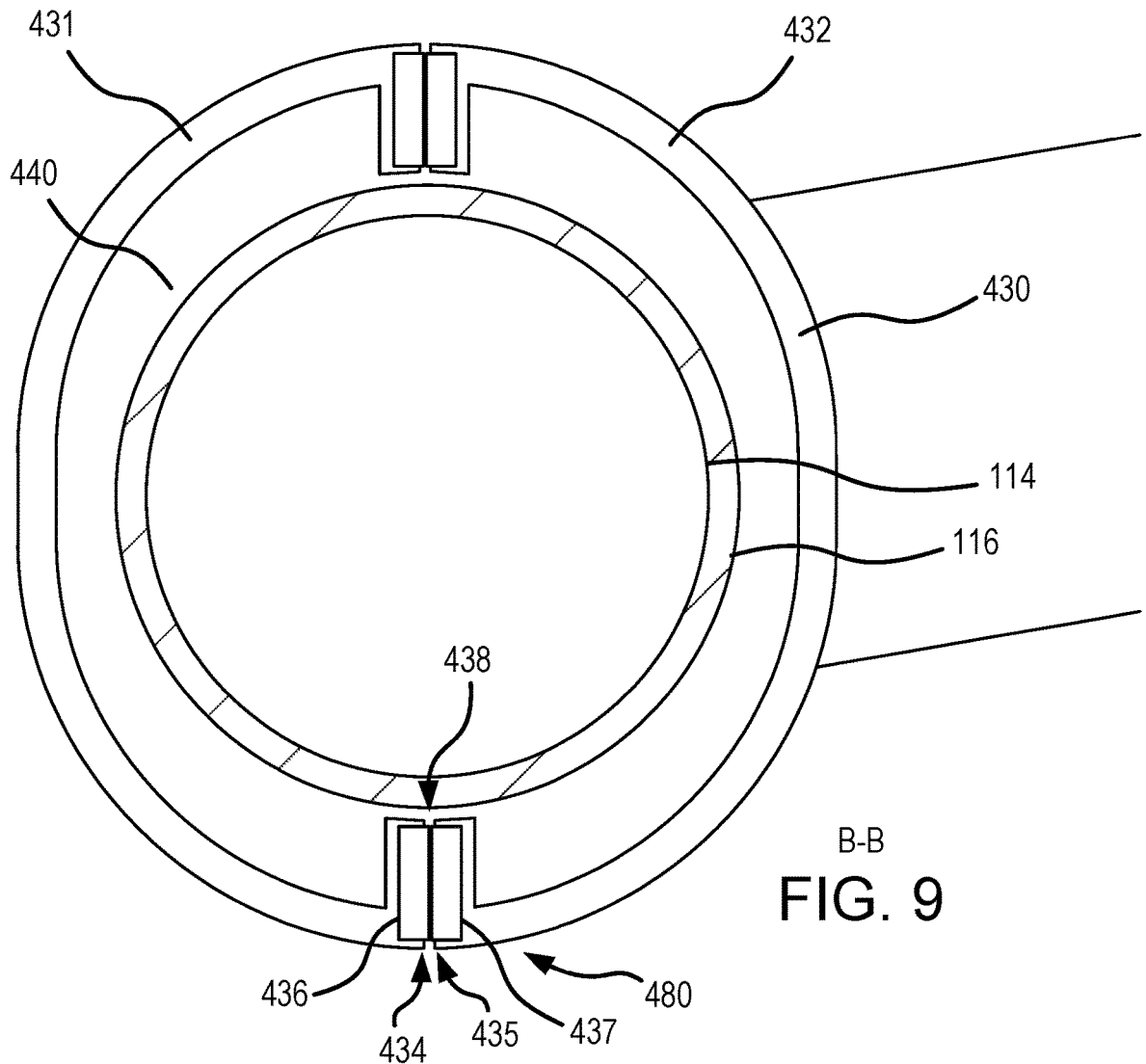
FIG. 9 illustrates a section view of the handle arrangement of FIG. 4B, except with the living hinge replaced with opposing magnets according to various embodiments.

In various embodiments, living hinge 433 may be replaced with opposing magnets coupled to first half 431 and second half 432 to secure first half 431 to second half 432, similar to first magnet 436 and second magnet 437, as illustrated in FIG. 9. In this regard, first half 431 and second half 432 may be two distinct pieces, in accordance with various embodiments.

Figure 10:
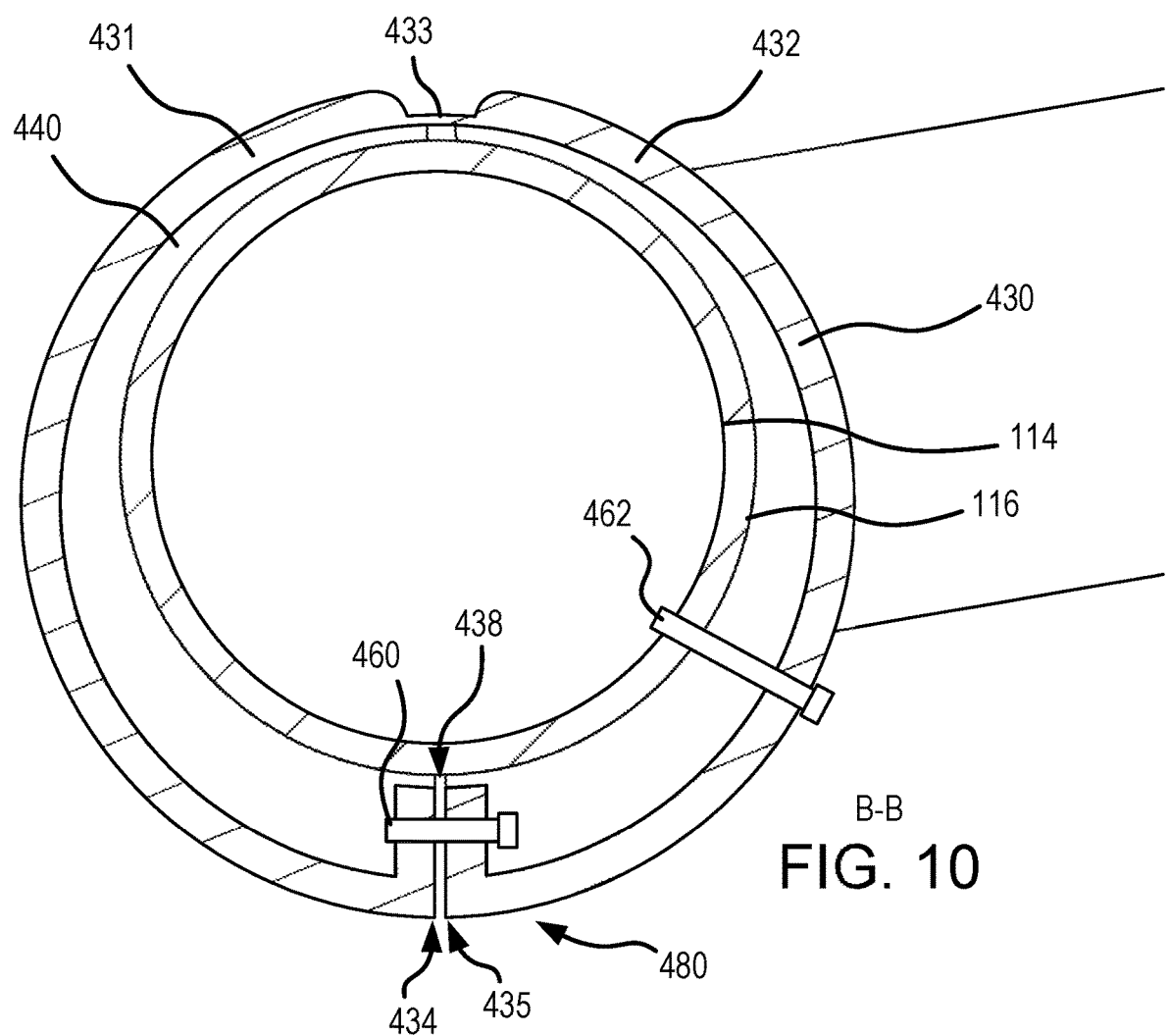
FIG. 10 illustrates a section view of the handle arrangement of FIG. 4B, except with the first and second half of the base mount secured to the shopping cart handle via one or more fasteners according to various embodiments.

In various embodiments, with momentary reference to FIG. 10, first half 431 and second half 432 may be secured together via a fastener 460, such as a bolt, rivet or a screw. In various embodiments, first half 431 and/or second half 432 may be secured to grip 116 and/or shopping cart handle 114 via a fastener 462. With the first half 431 and/or second half 432 secured to the shopping cart handle 114, the base mount 430 may be fixed with respect to shopping cart handle 114. Fastener 460 and/or fastener 462 may be added in addition to the other fastening features disclosure herein, or may be used in lieu of the other fastening features disclosed herein. Furthermore, fastener 460 may be used without fastener 462, or both fasteners 460, 462 may be used together. Furthermore, any number of fasteners 460 and/or fasteners 462 may be used along the length of base mount 430 or in various locations around the perimeter of the base mount 430 for securing base mount 430 to handle 114.

In various embodiments, base mount 430 comprises a compliant inner layer 440 configured to contact grip 116. Compliant inner layer 440 may be similar to compliant inner layer 140 (see FIG. 1H), in accordance with various embodiments.

Figure 4C:
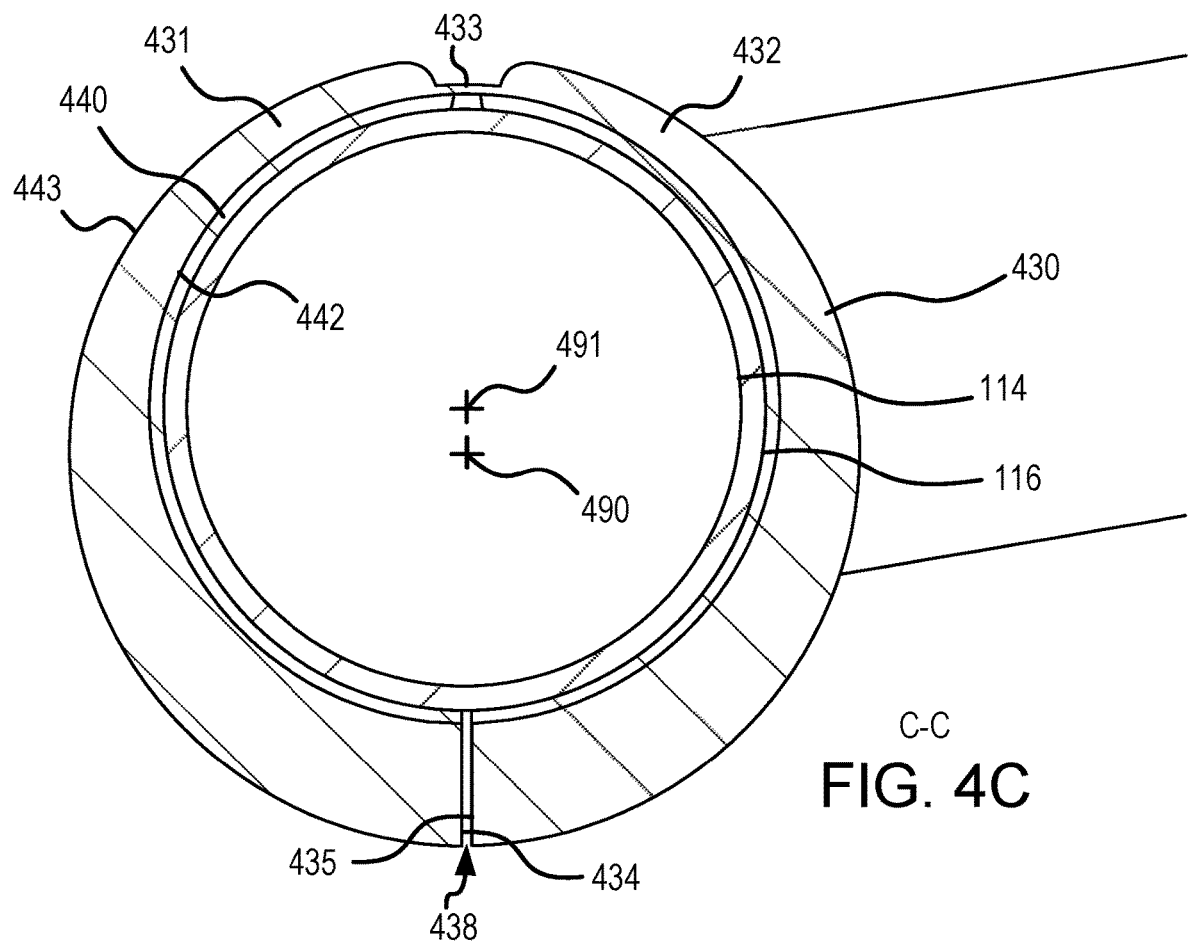
FIG. 4C illustrates a section view of the handle arrangement of FIG. 4A according to various embodiments.
Figure 4D:
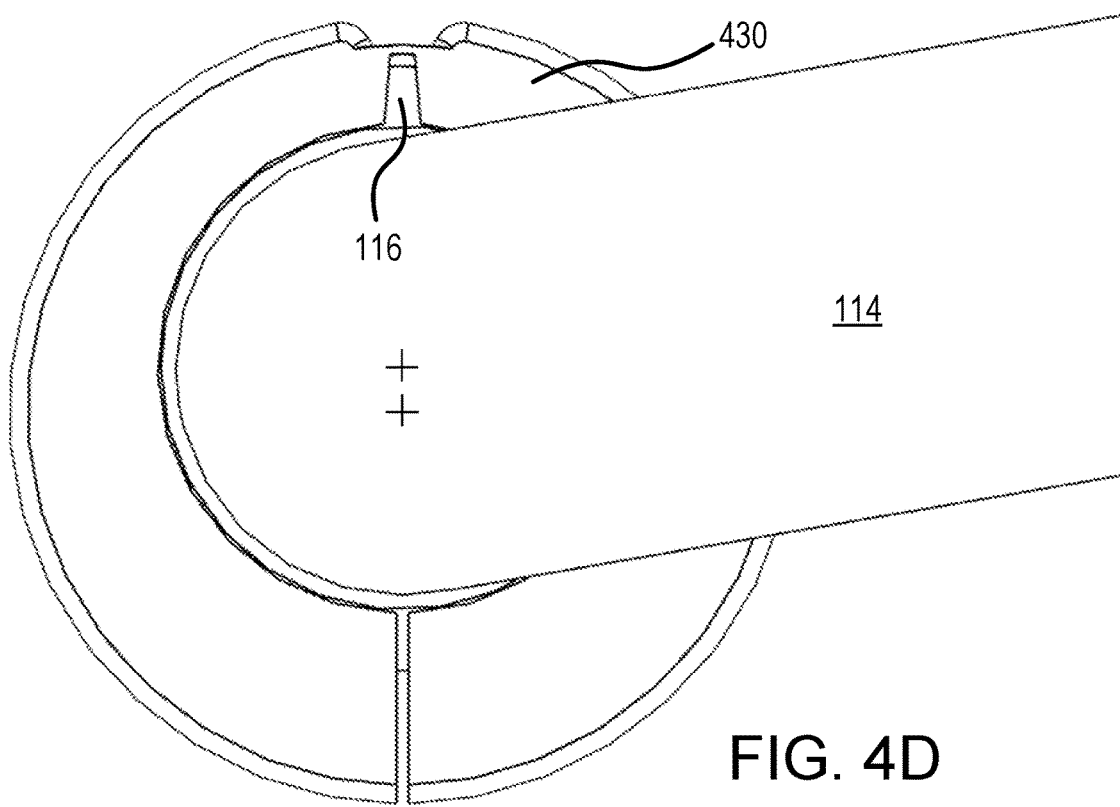
FIG. 4D illustrates a side view of the handle arrangement of FIG. 4A according to various embodiments.

With reference to FIG. 4C, a section view of base mount 430 taken along section C-C of FIG. 1B is illustrated, in accordance with various embodiments. With reference to FIG. 4D, a side view of base mount 430 installed over a shopping cart handle 114 is illustrated, in accordance with various embodiments.

In various embodiments, an inner diameter surface 442 of base mount 430 may define a centerline axis 491. In various embodiments, an outer diameter surface 443 of base mount 430 may define a centerline axis 490. Centerline axis 490 is offset from centerline axis 491, in accordance with various embodiments. In various embodiments, handle 114 and inner diameter surface 442 are in concentric alignment. In this regard, a total radial thickness of base mount 430 may vary along the circumferential direction.

Figure 4E:
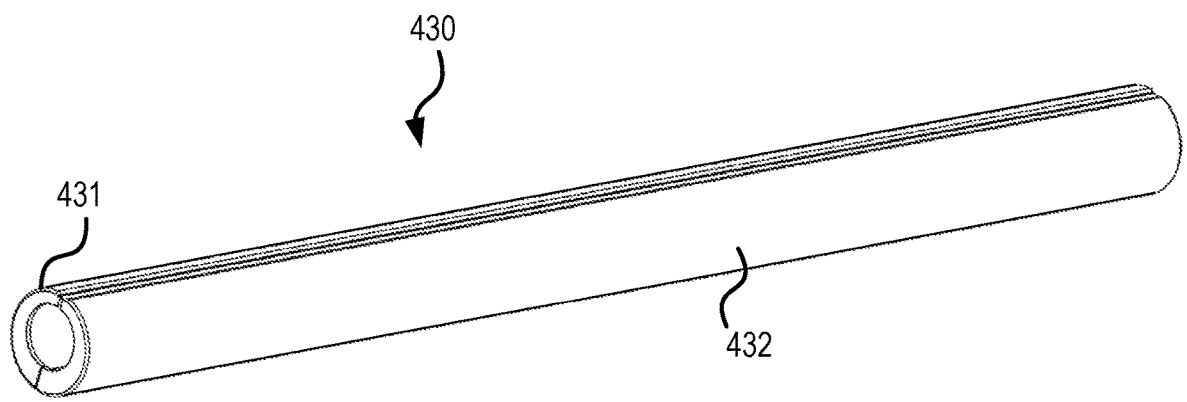
FIG. 4E illustrates a perspective view of the base mount of FIG. 4A according to various embodiments.
Figure 4F:
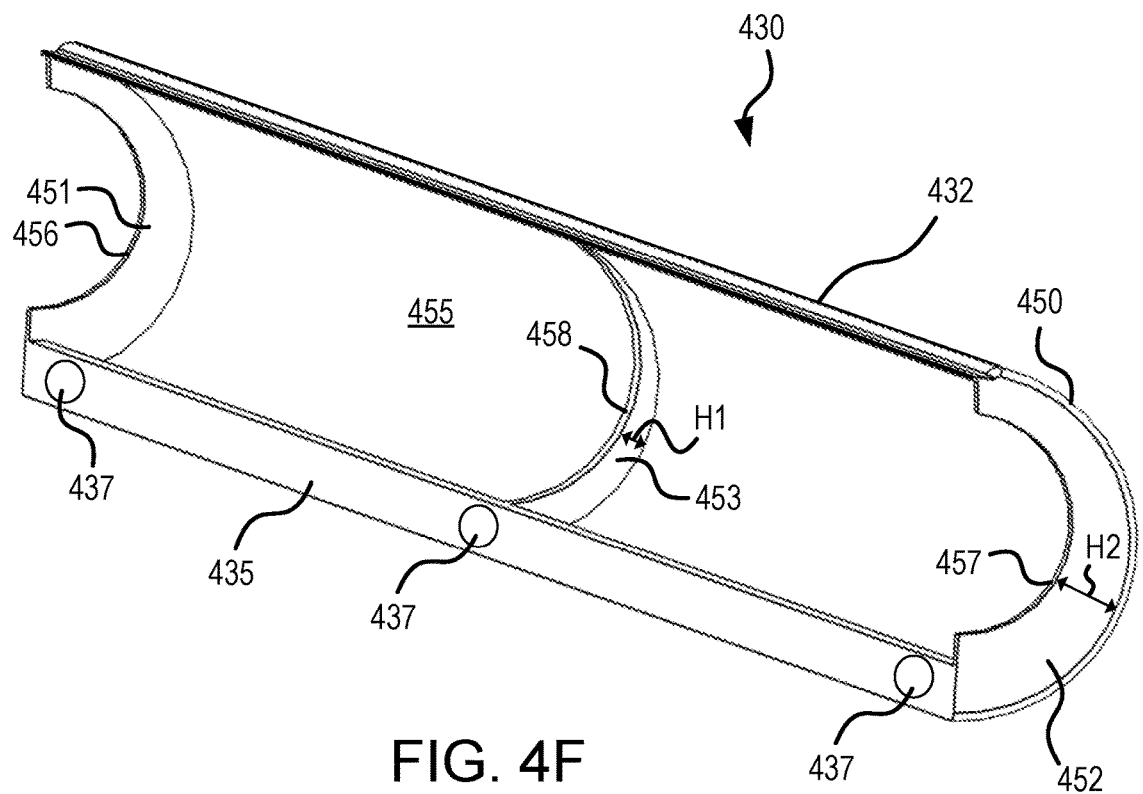
FIG. 4F illustrates a perspective view of a second half of the base mount of FIG. 4E according to various embodiments.

With reference to FIG. 4E, a perspective view of base mount 430 is illustrated, in accordance with various embodiments. In various embodiments, base mount 430 comprises a generally tubular geometry. With reference to FIG. 4F, a perspective view of second half 432 of base mount 430 is illustrated, in accordance with various embodiments. second half 432 may comprise an outer skin 450 and a plurality of ribs. In various embodiments, outer skin 450 comprises a first end rib 451 disposed at a first end of outer skin 450 and a second end rib 452 disposed at a second end of outer skin 450. First end rib 451 and second end rib 452 may extend from an interior surface 455 of outer skin 450. First end rib 451 may comprise a generally circular proximal surface 456. Second end rib 452 may comprise a generally circular proximal surface 457. Outer skin 450 may further comprises a middle rib 453 disposed between the first end rib 451 and the second end rib 452. Middle rib 453 may extend from interior surface 455 of outer skin 450. Middle rib 453 may comprise a generally circular proximal surface 458. In various embodiments, the height H1 of middle rib 453 is less than the height H2 of first end rib 451 and/or second end rib 452, wherein the height of the ribs is measured generally perpendicular to the interior surface 455 (perpendicular to the longitudinal axis of base mount 430). In this manner, middle rib 453 may be configured to extend to a grip of a shopping cart, and first end rib 451 and second end rib 452 may be configured to extend to a handle of the shopping cart.

Figure 5A:
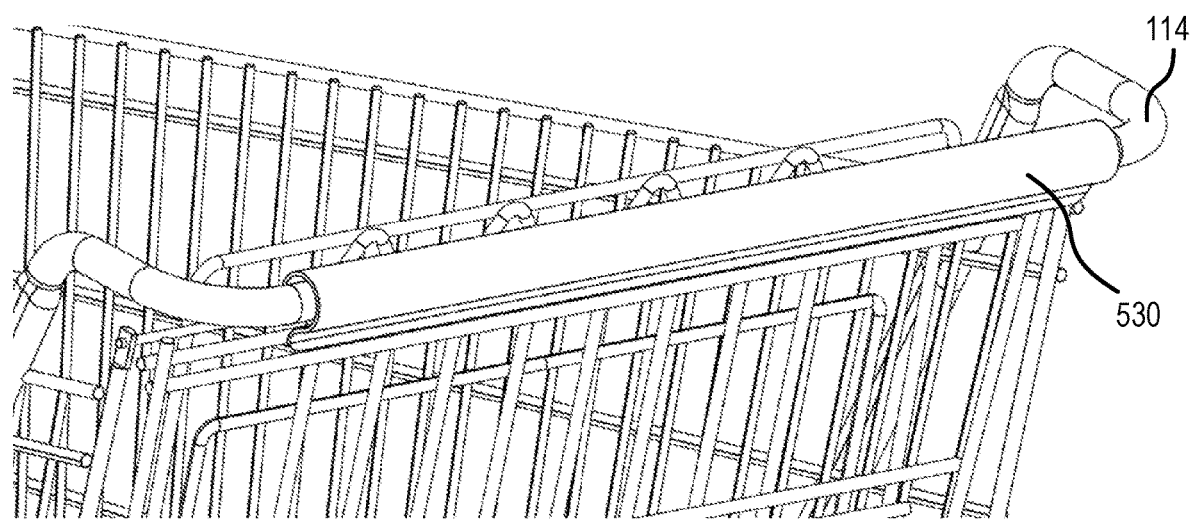
FIG. 5A illustrates a perspective view of a base mount installed over the shopping cart grip of FIG. 1C according to various embodiments.

With reference to FIG. 5A, shopping cart 100 is illustrated with a base mount 530 installed over grip 116 (see FIG. 1C). Outer sleeve 150 is omitted for clarity purposes. Base mount 530 may be constructed from a plastic material. Base mount 530 may be installed over grip 116 to provide a surface for installing an outer sleeve 150 (see FIG. 1E) to handle 114. Base mount 530 may be configured to be installed over various shopping cart handles 114 and/or shopping cart grips 116 to provide a standard (i.e., uniform) sized structure to which outer sleeve 150 (see FIG. 1E) is mounted.

Figure 5B:
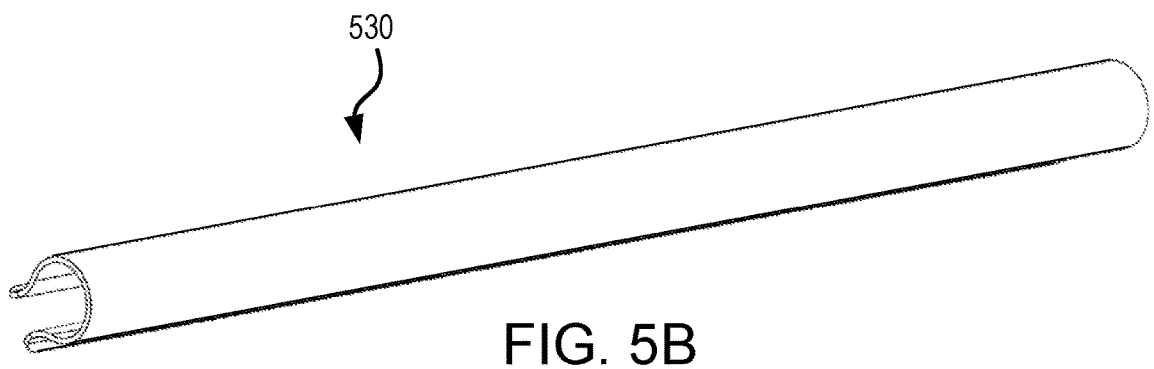
FIG. 5B illustrates a perspective view of the base mount of FIG. 5A according to various embodiments.
Figure 5C:
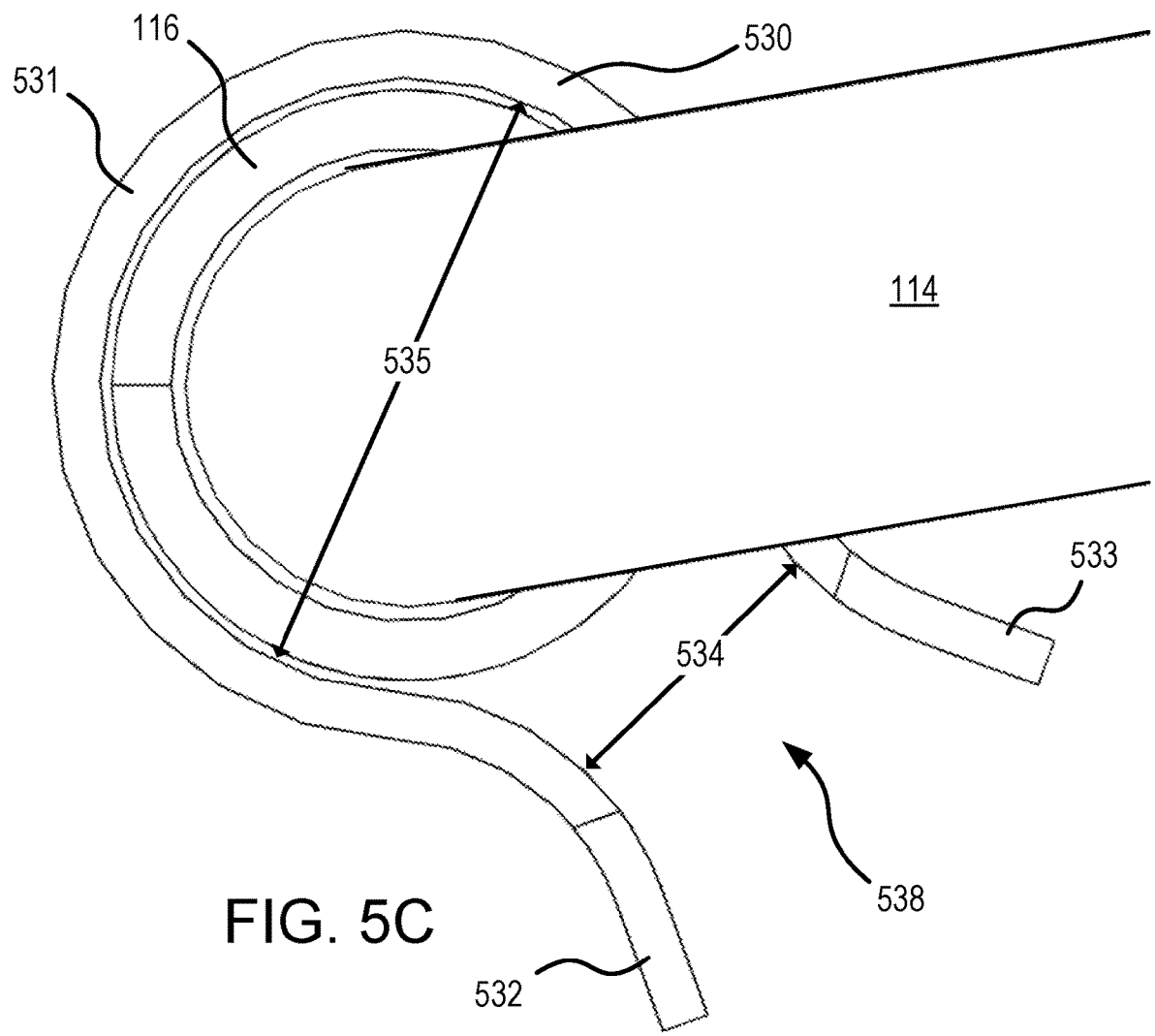
FIG. 5C illustrates a side view of the handle arrangement of FIG. 5A according to various embodiments.

With reference to FIG. 5B, a perspective view of base mount 530 is illustrated, in accordance with various embodiments. In various embodiments, base mount 530 comprises a generally tubular geometry. With reference to FIG. 5C, a side view of base mount 530 installed over handle 114 is illustrated, in accordance with various embodiments. Base mount 530 may comprise a generally tubular portion 531. Tubular portion 531 may be generally cylindrical. A longitudinally extending slit 538 is disposed in the base mount 530 whereby the handle 114 is received by the base mount 530. Flared sides may extend outward from tubular portion 531 and may at least partially define the longitudinally extending slit 538. In this regard, base mount 530 may comprise a first flared tab 532 extending outward from tubular portion 531 and a second flared tab 533 extending outward from tubular portion 531. A total width 534 of longitudinally extending slit 538 is less than an inner diameter 535 of tubular portion 531. In this manner, base mount 530 may be pushed over handle 114, wherein the first flared tab 532 and second flared tab 533 flex apart from each other in response to base mount 530 being pushed over handle 114. First flared tab 532 and second flared tab 533 may flex towards each other after base mount 530 is installed over handle 114 to secure base mount 530 to handle 114 and/or grip 116. In various embodiments, base mount 530 is held in compression around handle 114. In this regard, base mount 530 may undergo elastic deformation in response to being installed and/or removed from handle 114.

Having described various embodiments of shopping cart handle base mounts for outer sleeve 150 (see FIG. 1E), additional details are now described with respect to the plurality of disposable film layers disposed on the outer sleeve 150 for providing a sanitary surface for gripping cart handles.

Figure 6:
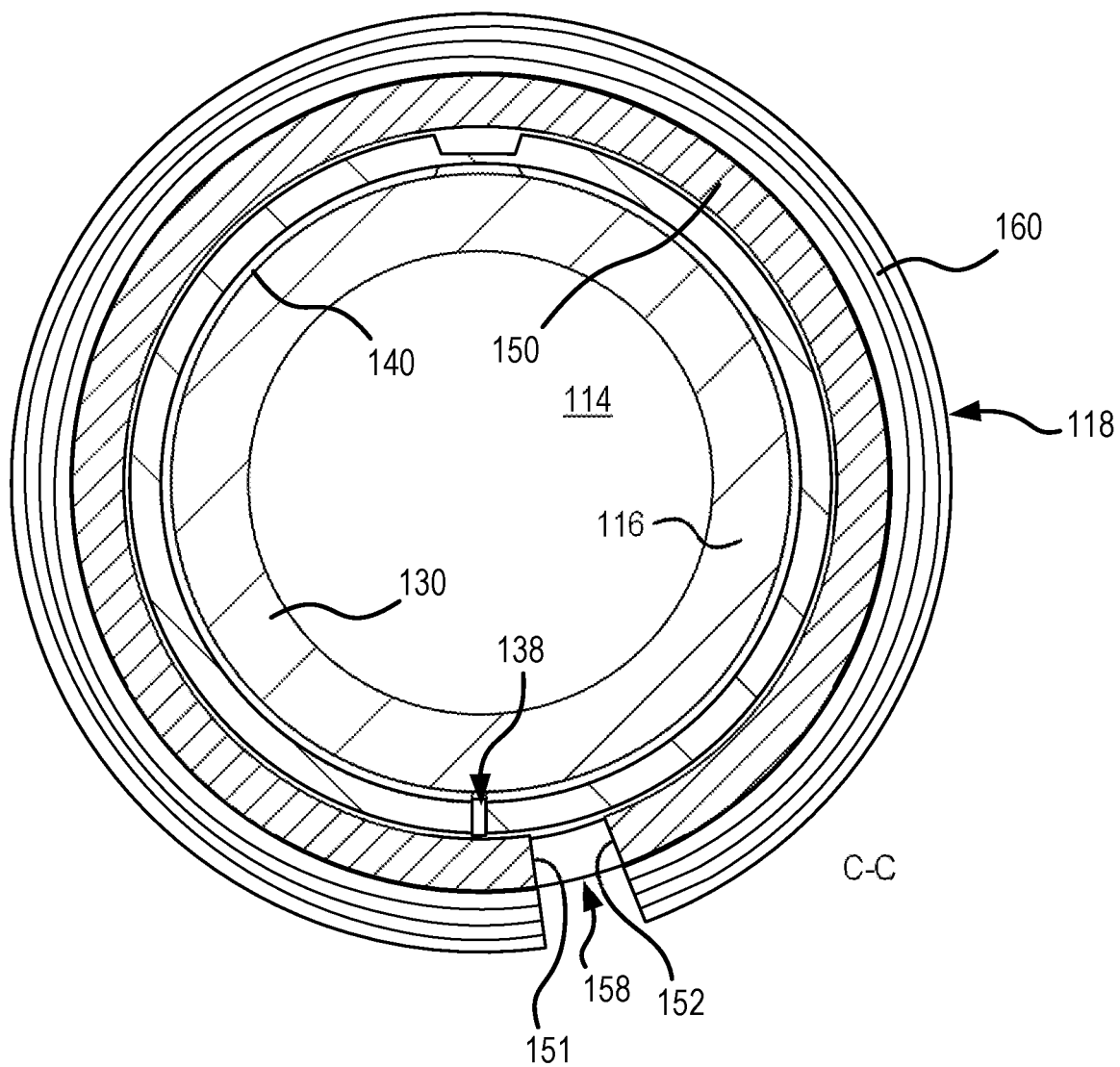
FIG. 6 illustrates a detailed view of the sanitary film layers disposed on the outer sleeve of FIG. 1I according to various embodiments.

With reference to FIG. 6, a cross-sectional view of the cart grip sanitary cover 118 taken along line C-C of FIG. 1B. As shown, the layers 160 of the sanitary cover 118 may be stacked so that the peripheries thereof are in alignment. In various embodiments, the layers 160 of the sanitary cover 118 may each have a substantially similar shape and size. However, it is contemplated that the sizes and shapes may be altered per the desires of the user.

In various embodiments, each layer 160 has a thickness of less than $\frac{1}{16}$th of an inch or, in various embodiments, less than $\frac{1}{32}$nd of an inch, or in various embodiments, less than $\frac{1}{64}$th of an inch. Each film layer 160 may be made from a plastic material or a paper material, in accordance with various embodiments. In various embodiments, each layer 160 has a thickness of from 0.00001 inches to 0.1 inches, from 0.0001 inches to 0.01 inches, and/or from 0.0005 inches to 0.001 inches. In various embodiments, each layer 160 has a thickness of 0.0005 inches. In various embodiments, each layer 160 may have a different thickness from one another.

In various embodiments, the layers 160 of the sanitary cover 118 may each have an outer surface area and length substantially similar to an area and length of the grip 116 of the cart 100, respectively, for providing sanitary protection. In various embodiments, this similarity may range between 50%-150% of the area and length of the grip 116 of the cart 100. However, it is contemplated that this design may be varied.

In various embodiments, antibacterial agents or other types of sanitizing substances may be used to lace the layers 160 of the sanitary cover 118. This feature may be used to further enhance the sanitary function of the sanitary cover 118. In that regard, one or more layers 160 may be doped and/or have embedded thereon various antimicrobial materials, such as silver, copper, nanoparticle silver, organosilanes, and/or other materials that tend to reduce or inhibit the capability of a microorganism to reproduce or remain in a viable form that is capable of infecting a human.

Figure 7:
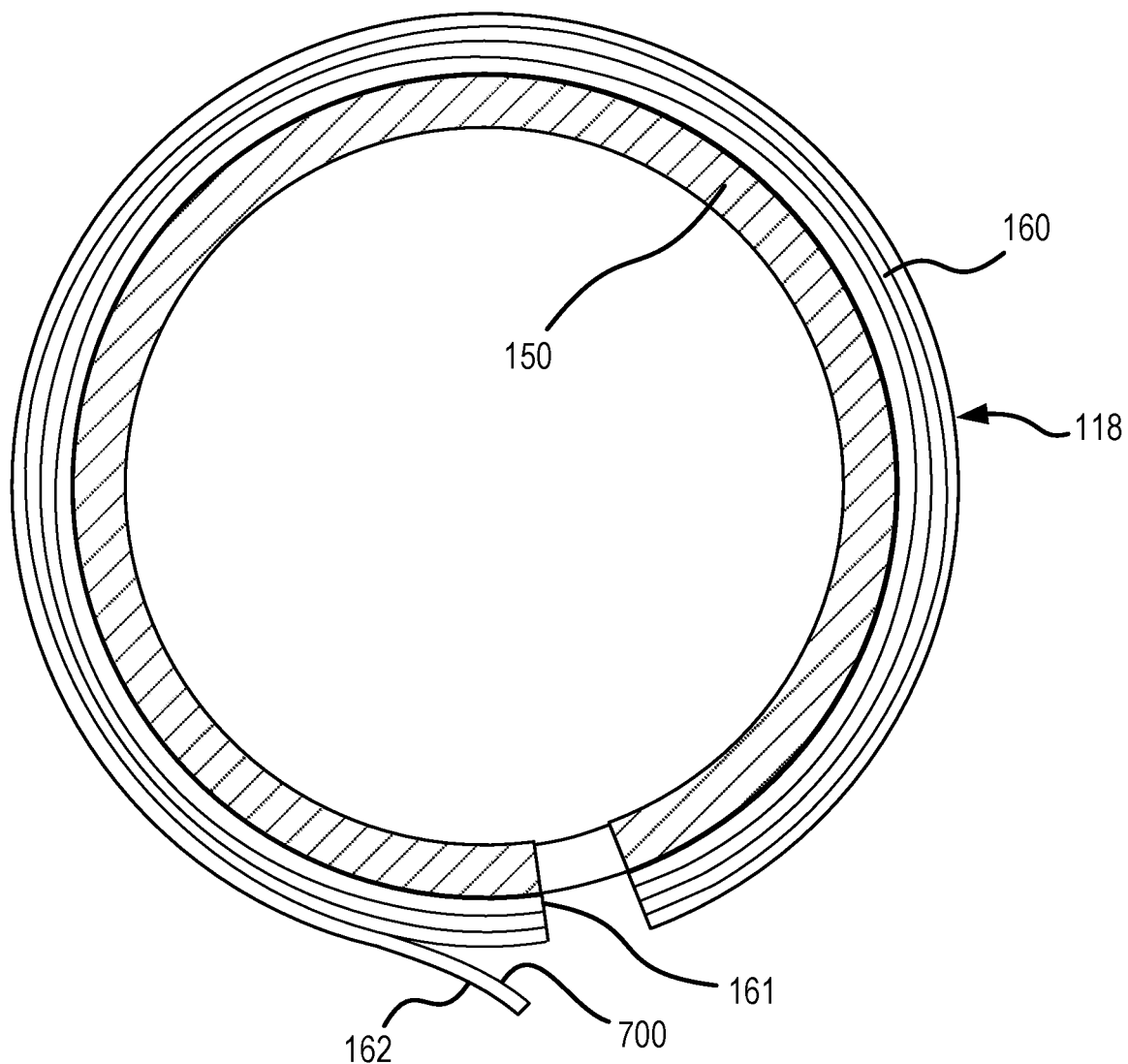
FIG. 7 illustrates an isolated view of the outer sleeve and sanitary film layers of FIG. 6, with an outermost film layer being removed for exposing another layer therebeneath for providing a sanitary surface for being gripped by a user according to various embodiments.

FIG. 7 illustrates an isolated view of the outer sleeve 150 of FIG. 6, with an outer layer of the sanitary cover 118 being removed, in accordance with various embodiments. In various embodiments, each of the layers 160 is equipped with a smooth planar top face, a smooth planar bottom face, and a rectangular periphery formed therebetween. The bottom face of each layer 160 may have an adhesive 700 formed on an entire surface thereof for adhering to a top face of an adjacent layer 160. In various embodiments, each layer 160 clings to the layer therebeneath via static adhesion. In various embodiments, each layer 160 clings to the layer therebeneath via a perforated seem. In this regard, each layer 160 may be torn (at the perforated seem) from the layer therebeneath. A bottommost layer 161 may be adhered to the outer surface of outer sleeve 150. In use, a topmost layer 162 of the sanitary cover 118 is removable for exposing another layer 160 therebeneath for providing a sanitary surface for being gripped by a user.

In various embodiments, a corner, side or edge of each layer 160 may be equipped with a tab or some other non-adhesive member that may be gripped by a user to facilitate the removal process. This operation may be continued until a bottommost layer 161 is exposed, after which outer sleeve 150 may be disposed, and a new outer sleeve 150 dispensed and applied to the grip 116 of the cart 100.

Figure 8:
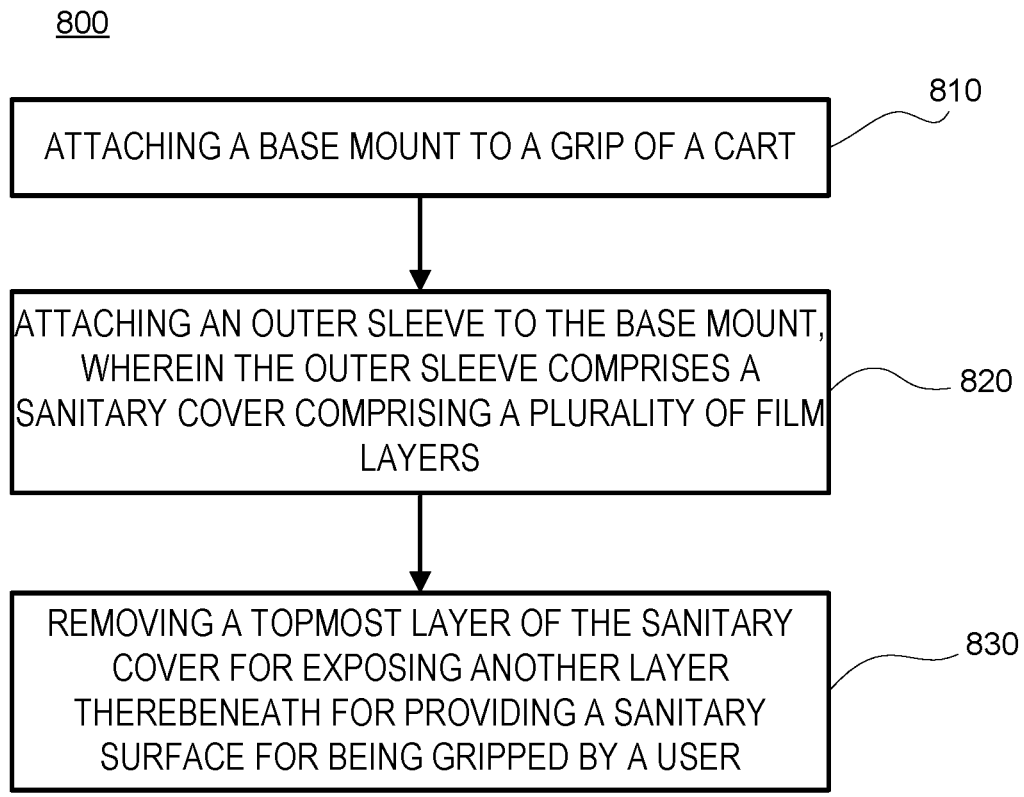
FIG. 8 illustrates a method of providing a sanitary surface on a grip of a shopping cart according to various embodiments.

With reference to FIG. 8, a method 800 for affording a sanitary surface on a grip 116 of the cart 100 is provided, in accordance with various embodiments. Method 800 includes attaching a base mount to a grip of a cart (step 810). Method 800 includes attaching an outer sleeve to the base mount, wherein the outer sleeve comprises a sanitary cover comprising a plurality of film layers (step 820). Method 800 includes removing a topmost layer of the sanitary cover for exposing another layer therebeneath for providing a sanitary surface for being gripped by a user (step 830).

With combined reference to FIG. 1D and FIG. 8, step 810 may include attaching base mount 130 to grip 116 of cart 100. With combined reference to FIG. 4A and FIG. 8, step 810 may include attaching base mount 430 to grip 116 of cart 100. With combined reference to FIG. 5A and FIG. 8, step 810 may include attaching base mount 530 to grip 116 of cart 100.

With combined reference to FIG. 1E and FIG. 8, step 820 may include attaching outer sleeve 150 to base mount 130 (see FIG. 1D). With combined reference to FIG. 1E and FIG. 8, step 820 may include attaching outer sleeve 150 to base mount 430 (see FIG. 4A). With combined reference to FIG. 1E and FIG. 8, step 820 may include attaching outer sleeve 150 to base mount 530 (see FIG. 5A).

With combined reference to FIG. 7 and FIG. 8, step 830 may include removing a topmost layer 162 of the sanitary cover 118 for exposing another layer 160 therebeneath for providing a sanitary surface for being gripped by a user.

Figure 11A:
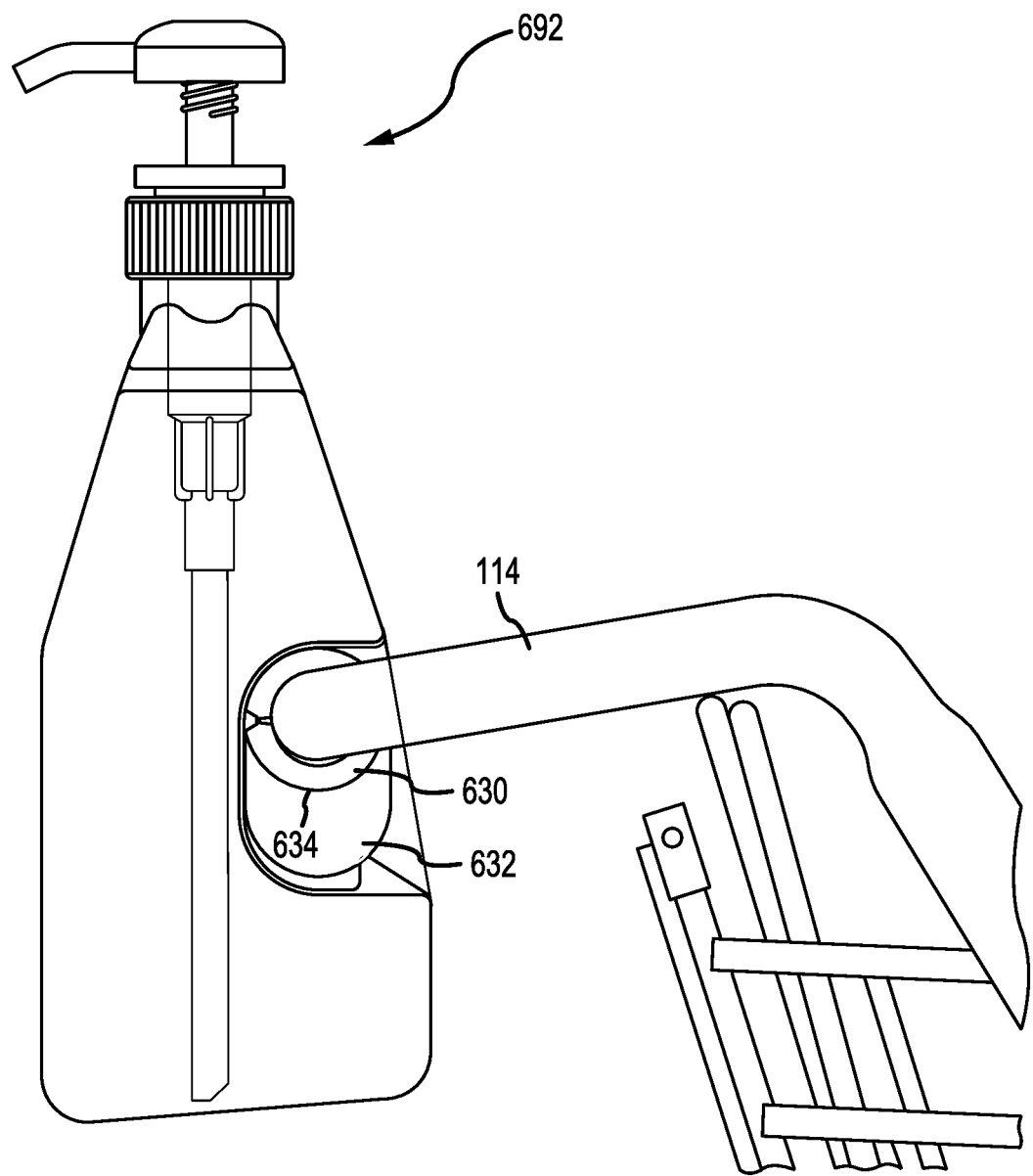
FIG. 11A illustrates a side view of a handle arrangement with a liquid container coupled to a base mount, according to various embodiments.

With reference to FIG. 11A, a base mount 630 is mounted to shopping cart handle 114, in accordance with various embodiments. Base mount 630 may be attached to shopping cart handle 114 similar to base mount 130, base mount 430, and/or base mount 530 as described herein. Base mount 630 may comprise a lobe 632 extending from the outer surface 634 of base mount 630. Lobe 632 may provide a location for attachment of a liquid container 692. In various embodiments, liquid container 692 is a hand sanitizer bottle, which may manually (e.g., via a hand pump) or automatically dispense hand sanitizer. Liquid container 692 may be detachably coupled to base mount 630.

Figure 11B:
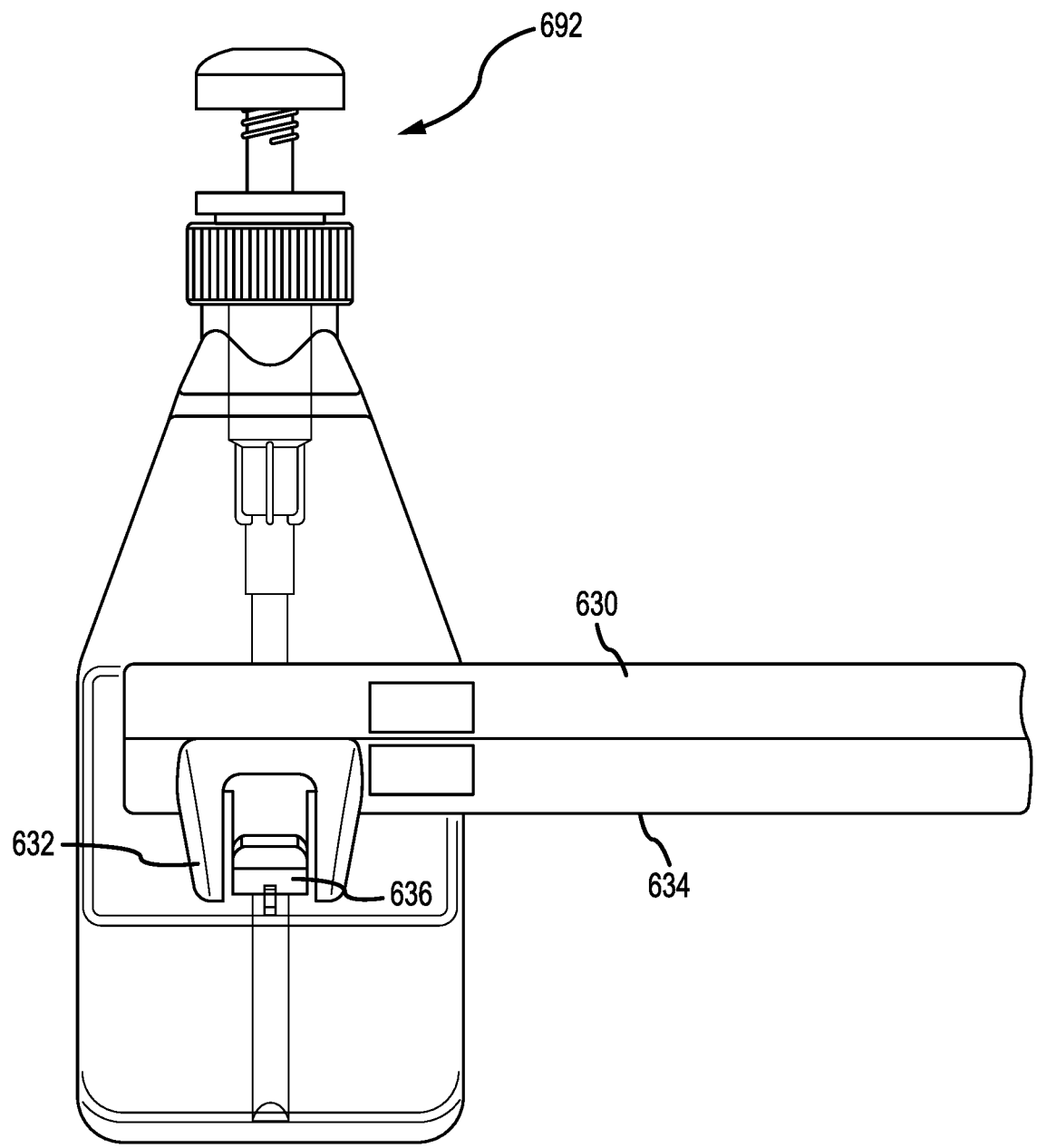
FIG. 11B illustrates a front view of the handle arrangement of FIG. 11A, according to various embodiments.
Figure 11C:
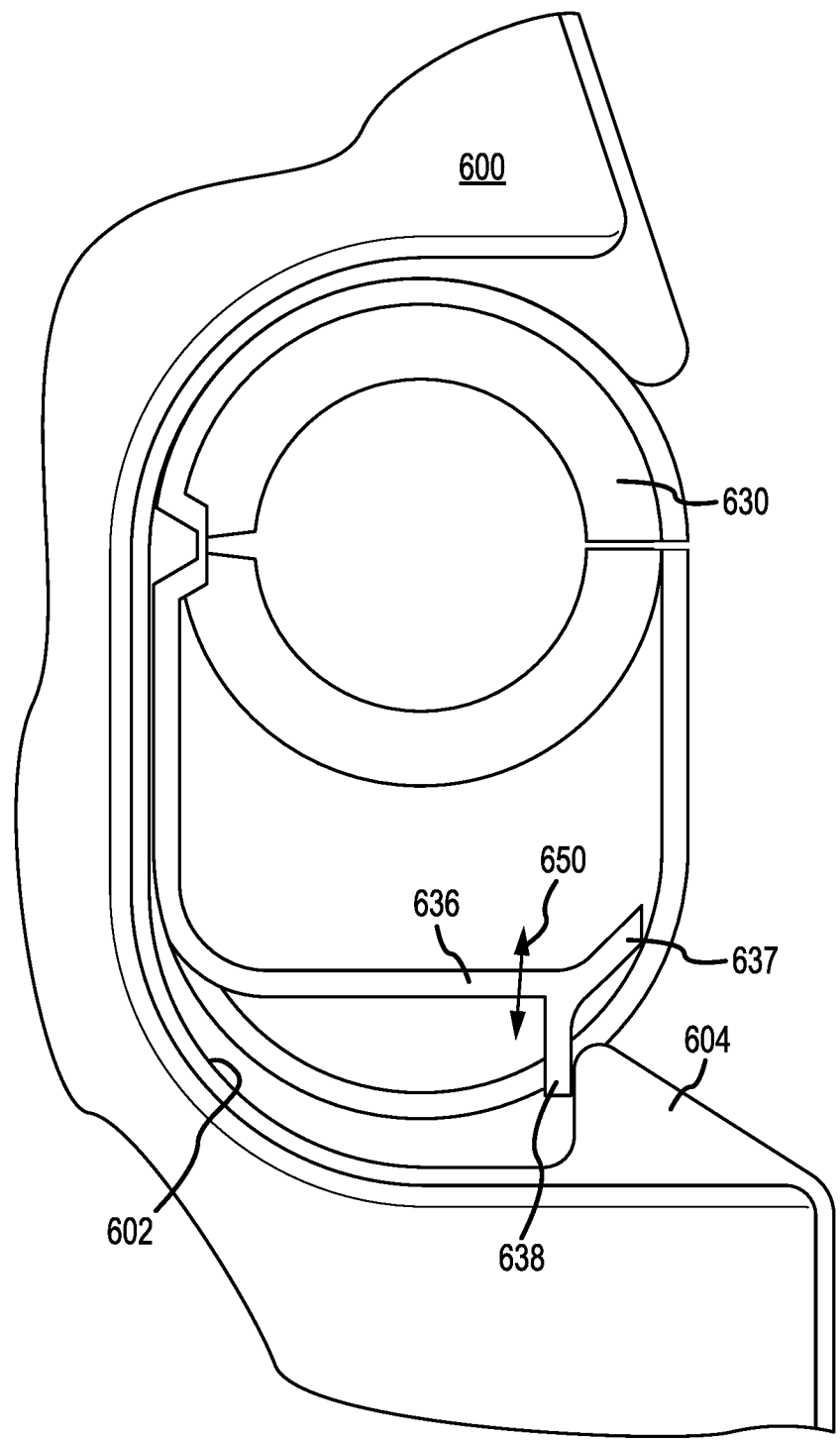
FIG. 11C illustrates a section view of the handle arrangement of FIG. 11A, according to various embodiments.

With reference to FIG. 11B, a tab may be formed into lobe 632. Tab 636 may be a flexible tab configured to move relative to the lobe 632 and/or outer surface 634 for attaching and detaching the liquid container 600. With reference to FIG. 11C, liquid container 600 may comprise a cutout 602 whereby the base mount 630 is received by the liquid container 600. In this regard, the geometry of cutout 602 may be complementary to the geometry of base member 630. In this manner, liquid container 600 may comprise a low profile geometry to not interfere with a user of the shopping cart. A ramp 604 may extend into the opening formed by cutout 602. Tab 636 may be moveable generally in the direction illustrated by arrow 650. Tab 636 may comprise an accessible extension 637 whereby a user may move tab 636 for detaching liquid container 600. Tab 636 may comprise a stopping extension 638 configured to engage (i.e., contact) ramp 604. For example, a user may push extension 637 away from ramp 604 (i.e., upwards in FIG. 11C) and stopping extension 638 may disengage from ramp 604. Stated differently, stopping extension 638 may move away from ramp 604 (i.e., upwards in FIG. 11C) in response to a user pushing or pulling upwards on extension 637. Conversely, stopping extension 638 may contact ramp 604 in response to liquid container being placed over base mount 630. The stopping extension 638 may flex away from ramp 604 as the liquid container is placed around base mount 630 until the stopping extension 638 clears the ramp 604 and locks the liquid container 600 in place.

As will be understood from the above, the present disclosure provides a simple and effective means for covering or shielding the grips of carts 100 and the like to prevent contamination of the user of such carts 100 with disease or infectious residues left from previous users of the cart 100. Sanitary covering arrangements of the present disclosure include a base mount for providing a standard size structure for attaching sanitary coverings to cart grips of various shapes and sizes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sanitary cover arrangement for a shopping cart handle, comprising:
 a tubular base mount configured to be coupled around the shopping cart handle;
 a tubular outer sleeve configured to be coupled around the tubular base mount; and
 a plurality of sanitary film layers coupled to the tubular outer sleeve, wherein each of the sanitary film layers are dispensable from the tubular outer sleeve, a topmost layer of the plurality of sanitary film layers being removable for exposing another layer therebeneath for providing a sanitary surface for gripping the shopping cart handle,
 wherein the tubular base mount comprises a first half and a second half,
 wherein the first half couples to the second half to secure the tubular base mount to the shopping cart handle,
 wherein the tubular base mount comprises a ratcheting locking mechanism for coupling the first half to the second half, and
 wherein the ratcheting locking mechanism comprises:
  a first tab extending from the first half, the first tab comprising a plurality of teeth; and
  a second tab extending from the second half, the second tab comprising a pawl configured to mechanically engage the plurality of teeth to lock the first half from pulling apart from the second half.

2. The sanitary cover arrangement of claim 1, wherein the tubular base mount comprises a living hinge whereby the first half is coupled to the second half.

3. The sanitary cover arrangement of claim 1, wherein the tubular base mount comprises a compliant inner layer configured to contact the shopping cart handle, and wherein the compliant inner layer is configured to conform to a geometry of the shopping cart handle.

4. The sanitary cover arrangement of claim 1, wherein the plurality of sanitary film layers are configured with an image printed thereon.

5. The sanitary cover arrangement of claim 4, wherein the image comprises at least one of an advertisement, a coupon, or a QR code.

6. The sanitary cover arrangement of claim 5, wherein the image is printed utilizing a time limited ink that degrades when exposed to ambient air.

* * * * *